United States Patent
Kato et al.

(10) Patent No.: US 9,319,142 B2
(45) Date of Patent: Apr. 19, 2016

(54) FULL-DUPLEX OPTICAL TRANSCEIVER APPLICABLE TO DIGITAL COHERENT SYSTEM

(71) Applicant: Sumitomo Electric Industries, Ltd., Osaka-shi (JP)

(72) Inventors: Takatoshi Kato, Yokohama (JP); Kazuhiro Yamaji, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/515,316

(22) Filed: Oct. 15, 2014

(65) Prior Publication Data

US 2015/0104177 A1  Apr. 16, 2015

(30) Foreign Application Priority Data

Oct. 16, 2013 (JP) ................... 2013-215484

(51) Int. Cl.
*H04B 10/40* (2013.01)
*H04B 10/61* (2013.01)
*G02B 6/42* (2006.01)

(52) U.S. Cl.
CPC .............. *H04B 10/40* (2013.01); *G02B 6/4213* (2013.01); *G02B 6/4246* (2013.01); *H04B 10/611* (2013.01)

(58) Field of Classification Search
CPC .................................................... H04B 10/611
See application file for complete search history.

(56) References Cited

U.S. PATENT DOCUMENTS

| 2002/0061174 | A1* | 5/2002 | Hurt ................... H04B 10/2503 385/92 |
| 2005/0002099 | A1* | 1/2005 | He ..................... H04B 10/2572 359/489.08 |
| 2007/0154221 | A1* | 7/2007 | McNicol ................ H04B 10/50 398/135 |
| 2008/0232816 | A1 | 9/2008 | Hoshida et al. |
| 2009/0244685 | A1 | 10/2009 | Hoshida et al. |
| 2012/0148235 | A1 | 6/2012 | Nishihara et al. |
| 2015/0049984 | A1* | 2/2015 | Kato ...................... G02F 1/225 385/31 |

FOREIGN PATENT DOCUMENTS

| JP | 2009-244682 A | 10/2009 |
| JP | 2012-110024 A | 6/2012 |
| JP | 2012-129656 A | 7/2012 |
| JP | 2013-090292 A | 5/2013 |

\* cited by examiner

*Primary Examiner* — Nathan Curs
(74) *Attorney, Agent, or Firm* — Venable LLP; Michael A. Sartori; F. Brock Riggs

(57) ABSTRACT

An optical transceiver applicable to the coherent communication is disclosed. The optical transceiver includes a laser module, a transmitter module to output a transmitting signal by modulating a phase of an laser beam output from the laser module, and a receiver module to receive a receiving signal modulated in the phase thereof and extract data by multiplying the receiving signal with an laser beam output from the laser module.

11 Claims, 19 Drawing Sheets

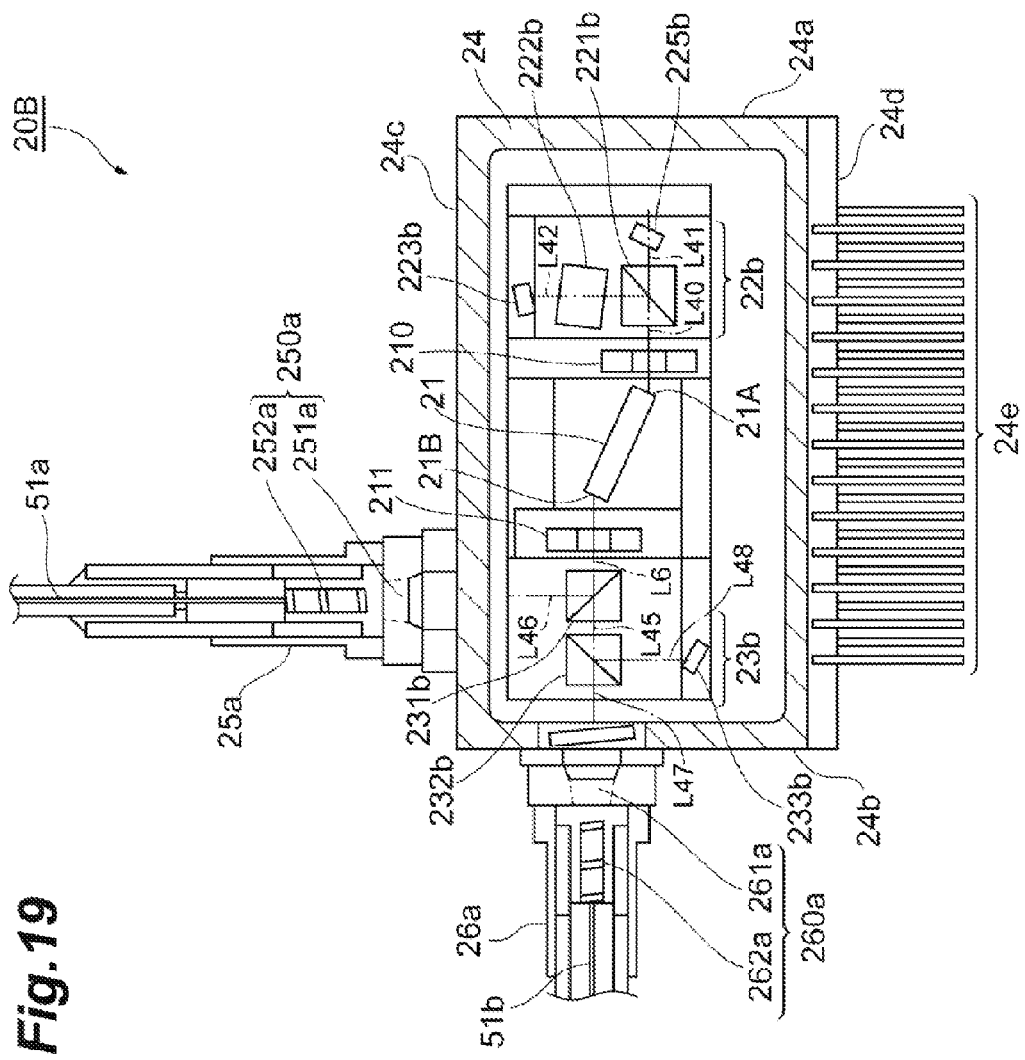

FULL-DUPLEX OPTICAL TRANSCEIVER APPLICABLE TO DIGITAL COHERENT SYSTEM

TECHNICAL FIELD

The present application relates to an optical transceiver with the full-duplex configuration, in particular, the present application relates to a full-duplex optical transceiver applicable to the digital coherent system.

BACKGROUND

One type of optical modulations has been knows as, what is called, quadrature amplitude modulation (QAM). A United States Patent, US 2009/244685A, has disclosed an optical modulator to modulate an optical signal by the QAM configuration. Another United States Patent, US 2008/232816A, has disclosed a transmitter module and a receiver module for an optical communication system with a polarization multiplexed configuration. Still another United States Patent, US 2012/148235A, has disclosed a control circuit for a transmitter module and a receiver module implemented within in the digital coherent system.

The digital coherent system has been known as a technique to enhance the transmission capacity. When an optical transceiver with the full-duplex function is implemented within the digital coherent system, various subjects are to be solved. That is, the coherent system not only requires an optical source to generate optical signals but inevitably requires another optical source, which is often called as a local source, in a receiver module. The requirement of two optical sources makes the optical transceiver with the full-duplex function hard to be formed in compact. For example, one standard relating to a housing, which is known as the "CFP2" standard, are quite hard to install two optical sources, an optical modulator, a coherent receiver, and so on within one housing.

SUMMARY

An optical transceiver of the present application has a function of the full-duplex optical communication for a pair of optical fibers. The optical transceiver includes a wavelength tunable laser diode (LD), an optical transmitter, and an optical receiver. The optical transmitter output an outgoing optical signal to one of the optical fibers by modulating a phase of an laser beam output from the wavelength tunable LD. The optical receiver receives an incoming optical signal from another of the optical fibers, where the incoming optical signal is modulated in the phase thereof, and extract data contained in the incoming optical signal by multiplexing the incoming optical signal with another of an laser beam also output from the wavelength tunable LD.

The wavelength tunable LD includes a pair of facets. One of facets outputs the laser beam for the optical transmitter; while, the other facets outputs the another laser beam for the optical receiver. In a modification, one of the facets outputs the laser beam for the optical transmitter and another of the laser beam for the optical receiver. Another of the facets may output an laser beam for tuning the wavelength of the laser beams.

The optical transceiver may further includes a laser module having a laser housing for enclosing the wavelength tunable LD, a transmitter module having a transmitter housing for enclosing the optical transmitter, and a receiver module having a receiver housing for enclosing the optical receiver, where the housings are separated from of each other.

BRIEF DESCRIPTION OF THE DRAWINGS

The foregoing and other purposes, aspects and advantages will be better understood from the following detailed description of a preferred embodiment of the invention with reference to the drawings, in which:

FIG. 19 is a plan view showing an inside of a laser module 20B according to the third embodiment of the present invention.

DETAILED DESCRIPTION

Next, some embodiments of the present application will be described as referring to drawings. In the description of the drawings, numerals or symbols same with or similar to each other will refer to elements same with or similar to each other without duplicating explanations.

First Embodiment

Figure 1:
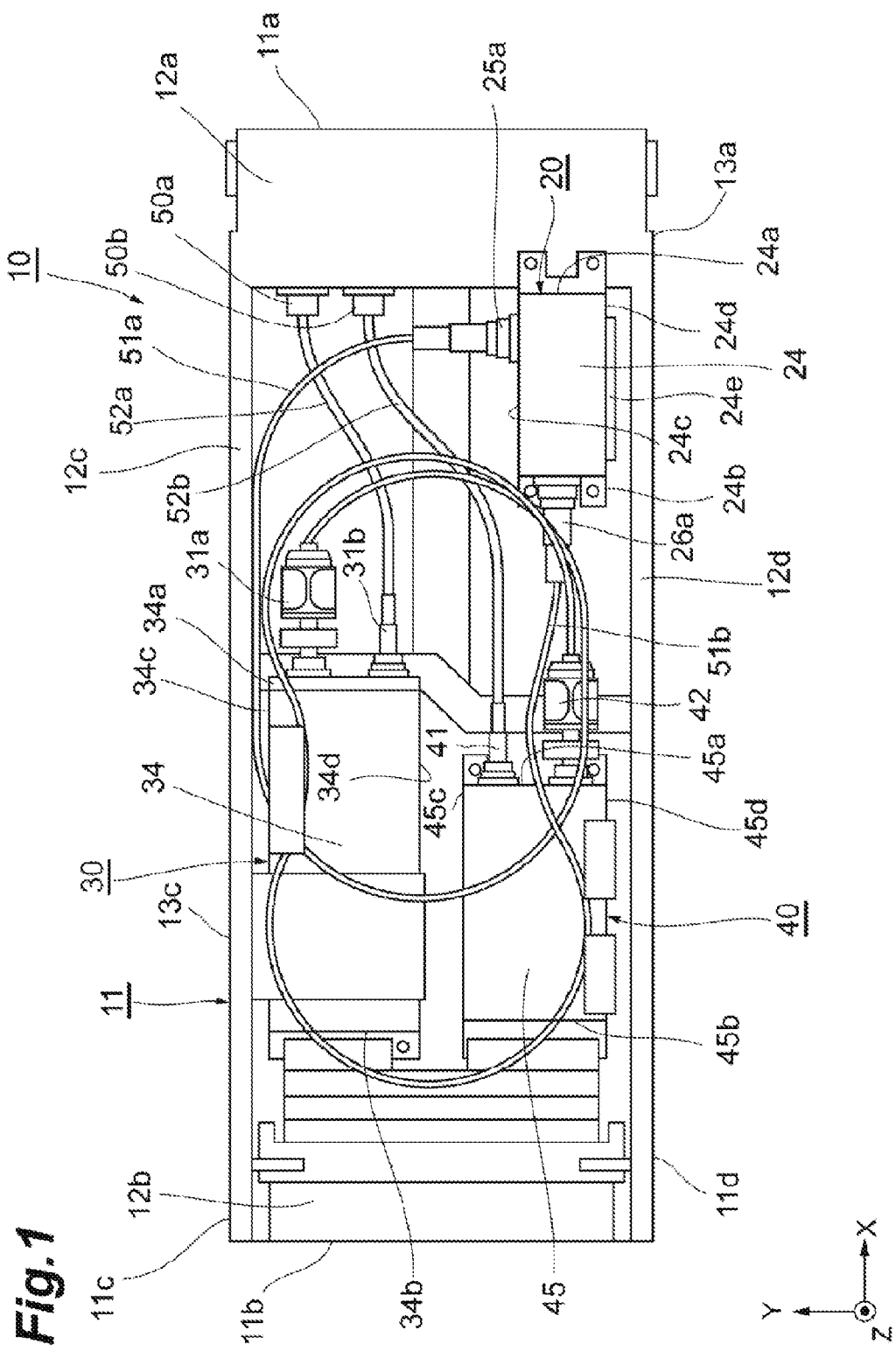
FIG. 1 is a plain view showing an inside of an optical transceiver with the full-duplex function according to the first embodiment of the present invention.

FIG. 1 is a plain view showing an inside of an optical transceiver 10 with the full-duplex function according to the first embodiment of the present invention. As illustrated in FIG. 1, the optical transceiver 10 includes a housing 11, a laser module 20, a transmitter module 30, a receiver module 40, and several inner fibers, 51a to 52b, optically coupling those sub-modules, 20 to 40.

The housing 11 has a rectangular shape with a longitudinal direction along an axis X and a lateral direction along another axis Y, where the axes, X and Y, are indicated in FIG. 1. The housing 11 provides a pair of sides, 11a and 11b, extending along the lateral direction Y, and another pair of sides, 11c and 11d, extending along the longitudinal direction X.

The housing 11 also provides a front block 12a and an electrical plug 12b. The front block 12a forms the side 11a and has a depth along the longitudinal direction X. The electrical plug 12b forms another side 11b and extends along the lateral direction Y. A side wall 12c that forms the side 11c and extends along the longitudinal direction X; and another side wall 12d that forms the side 11d and extends also along the longitudinal direction X. The front block 12a has a pair of receptacles, 50a and 50b, the former of which is for the optical transmission, while, the latter is for the optical reception. The optical receptacles, 50a and 50b, may have an arrangement of the LC-type optical receptacle in the present embodiment. The optical transceiver 10 may perform the full-duplex communication through optical fibers each coupled with the optical receptacles independently.

The housing 11 shown in FIG. 1 follows the standard of the CFP2. Specifically, the housing 11 has a length of 106 mm along the longitudinal direction X, a width of 41.5 mm along the lateral direction Y, and a height of 12.4 mm along the direction Z. The dimensions described above involves the optical receptacles, 50a and 50b, and the electrical plug 12b; accordingly, a space provided for sub-modules, 20 to 40, is limited to about 75 mm along the longitudinal direction X. Thus, the sub-modules, 20 to 40, are set within such a limited space, or, the optical transceiver following the CFP2 standard in the housing thereof is necessary to install sub-modules within a quite limited space.

The laser module 20, which provides laser beams to the transmitter and receiver modules, 30 and 40, is arranged close to the front block 12a and the side wall 12d. The laser module 20 includes a wavelength tunable LD and a laser housing 24 to install the wavelength tunable LD therein. The laser housing 24, which has a rectangular shape with longitudinal sides along the direction X and lateral sides along the direction Y, provides a pair of sides, 24a and 24b, extending along the direction Y, and another pair of sides, 24c and 24d, extending along the direction X. The side 24a faces the front block 12a, while, the side 24d faces the side wall 12d. The present embodiment of the laser housing 24 provides lead terminals 24e for DC and low frequency (LF) signals only in the side 24d. The lead terminals 24e electrically couples with the electrical plug 12b through a circuit board, which is not shown in the figures.

The transmitter module 30 generates an outgoing optical signal to be transmitted from the optical transceiver 10 by modulating the laser beam output from the laser module 20. The present embodiment disposes the optical transmitter 30 in a position close to the side wall 12c and to the electrical plug 12b. The transmitter module 30 provides a transmitter housing 34, which is independent of the laser housing 24, with a rectangular shape having longitudinal sides along the direction X and lateral sides along the direction Y. The transmitter housing 34 provides a pair of sides, 34a and 34b, extending along the direction Y, and another pair of sides, 34c and 34d, extending along the direction X. The side 34c faces the side wall 12c, while, the side 34b faces the electrical plug 12b. The transmitter housing 34 of the present embodiment has, what is called, a butterfly package with radio frequency (RF) terminals in the side 34b, while, DC/LF terminals in the sides, 34c and 34d. These terminals are electrically connected to the electrical plug 12b through a circuit board and/or a flexibly printed circuit board. The transmitter housing 34 may have dimensions, except for RF terminals and DC/LF terminals, of 37 mm×16.5 mm (L×W).

The receiver module 40 receives an incoming optical signal, whose phase is modulated and sometimes the amplitude thereof is also modulated, extracts data/information by multiplying the incoming optical signal with a laser beam output from the laser module 20. The present optical transceiver 10 disposes the receiver module 40 close to the side wall 12d and to the electrical plug 12b. The transmitter and receiver modules, 30 and 40 are disposed in side by side along the direction Y in the present optical transceiver 10. The receiver module 40 provides a receiver housing 45 independent of the laser housing 24 and the transmitter housing 34. The receiver housing 45, which has also a rectangular shape of a longitudinal direction along the direction X and a lateral direction along the direction Y, provides a pair of sides, 45a and 45b, extending along the direction Y, and another pair of sides, 45c and 45d, extending along the direction X. The side 45d faces the side wall 12d, while, the side 45b faces the electrical plug 12b. The receiver housing 45 may also have the butterfly package with RF terminals in the side 45b and DC/LF terminals in the sides, 45c and 45d. The RF and DC/LF terminals are electrically coupled with the electrical plug 12b through the circuit board or the flexible printed circuit board.

The inner fiber 51a transmits the laser beam to the transmitter module 30 from the laser module 20. The inner fiber 51a in one end thereof optically couples with one of the output ports 25a provided in the side 24c of the laser housing 24, while, couples with the input port 31a provided in the side 34a of the transmitter housing 34. Another inner fiber 51b, which is the second inner fiber in the present embodiment, transmits the laser beam generated in the laser module 20 to the receiver module 40. The inner fiber 52b in one end thereof couples with the other output port 26a provided in the side 24b of the laser housing 24, while, anther end thereof couples with one of the input ports 42 provided in the side 45a of the receiver housing 40. These two fibers, 51a and 51b, are the polarization maintaining fiber to maintain the polarization direction of the laser beams.

The laser housing 24 of the present embodiment provides the output port 25a in the side 24c along the lateral direction X, while, the other output port 26a in the side 24b along the longitudinal direction Y. The first inner fiber 51a extends from the laser module 20 along the first direction (Y direction), and the second inner fiber 51b extends from the laser module 20 along the second direction (X direction) perpendicular to the first direction.

Moreover, the first and second inner fibers, 51a and 51b, of the present embodiment each have at least one loop. That is, the second inner fiber 51b, which is pulled out from the output port 26a of the laser module 20; extends to a rear portion of the optical transceiver 10 along the side wall 12d; turns by about 180° in the rear portion to head to the front portion of the housing 11; extends to the other side 12c; turns again by about 180° in the front portion so as to align the axis thereof with the axis of the input port 42, and couples with the input port 42. Similarly, the first inner fiber 51a, which is pulled out from the output port 25a; extends to the other side wall 12c; turns by about 90°; extends along the side wall 12c toward the rear portion; turns by about 180° at the rear portion toward the front portion; extends along the other side wall 12d; and turns again by about 180° in the front portion so as to align the axis thereof with the input port 31a of the transmitter housing 34, and couples with the input port 31a.

Thus, the first inner fiber 51a forms a large single loop to touch, or almost touch the sides walls, 12c and 12d, in the lateral direction Y; while, to reach respective center portions of the transmitter housing 34 and the receiver housing 45 in the longitudinal direction X. Similarly, the second fiber 51b forms a large single loop to touch, or almost touch the side walls, 12c and 12d, in the lateral direction Y, while, to exceed or over the transmitter housing 34 and the receiver housing 45 in the longitudinal direction X.

The input port 31a of the transmitter housing 34 and the input port 42 of the receiver housing 45 each provides a polarization maintaining connector. Accordingly, the inner fibers, 51a and 51b, may be detachable with the input ports, 31a and 42, which enhances the productivity of the optical transceiver 10. Specifically, the transmitter and receiver modules, 30 and 40, may be facilitated to be installed within the space of the optical transceiver 10, and the inner fibers, 51a and 51b, become easy to be disposed. The inner fiber 51a shown in FIG. 1 is connected to the input port 31a with a substantial angle. However, extending the inner fiber 51a further toward the front portion exceeding the laser housing 24, or almost touching the front block 12a, the inner fiber 51a may be connected to the input port 31a straightforwardly.

Another inner fiber 52a transmits the outgoing optical signal output from the transmitter module 30 to the transmitter optical receptacle 50a. Specifically, one end of the inner fiber 52a couples with the output 31b provided in the side 34a of the transmitter housing 34, while, another one thereof is connected to the transmitter optical receptacle 50a. Still another inner fiber 52b transmits the incoming optical signal provided from an external optical fiber and output from the receiver optical receptacle 50b to the receiver module 40. Specifically, one end of the inner fiber 52b is connected to the receiver optical receptacle 50b, while, another end thereof is connected to the input port 41 provided in the side 45a of the receiver housing 45. The inner fibers, 52a and 52b, may be permanently connected to the transmitter receptacle 50a, the receiver optical receptacle 50b, the output port 31b, and the input port 41.

Figure 2:
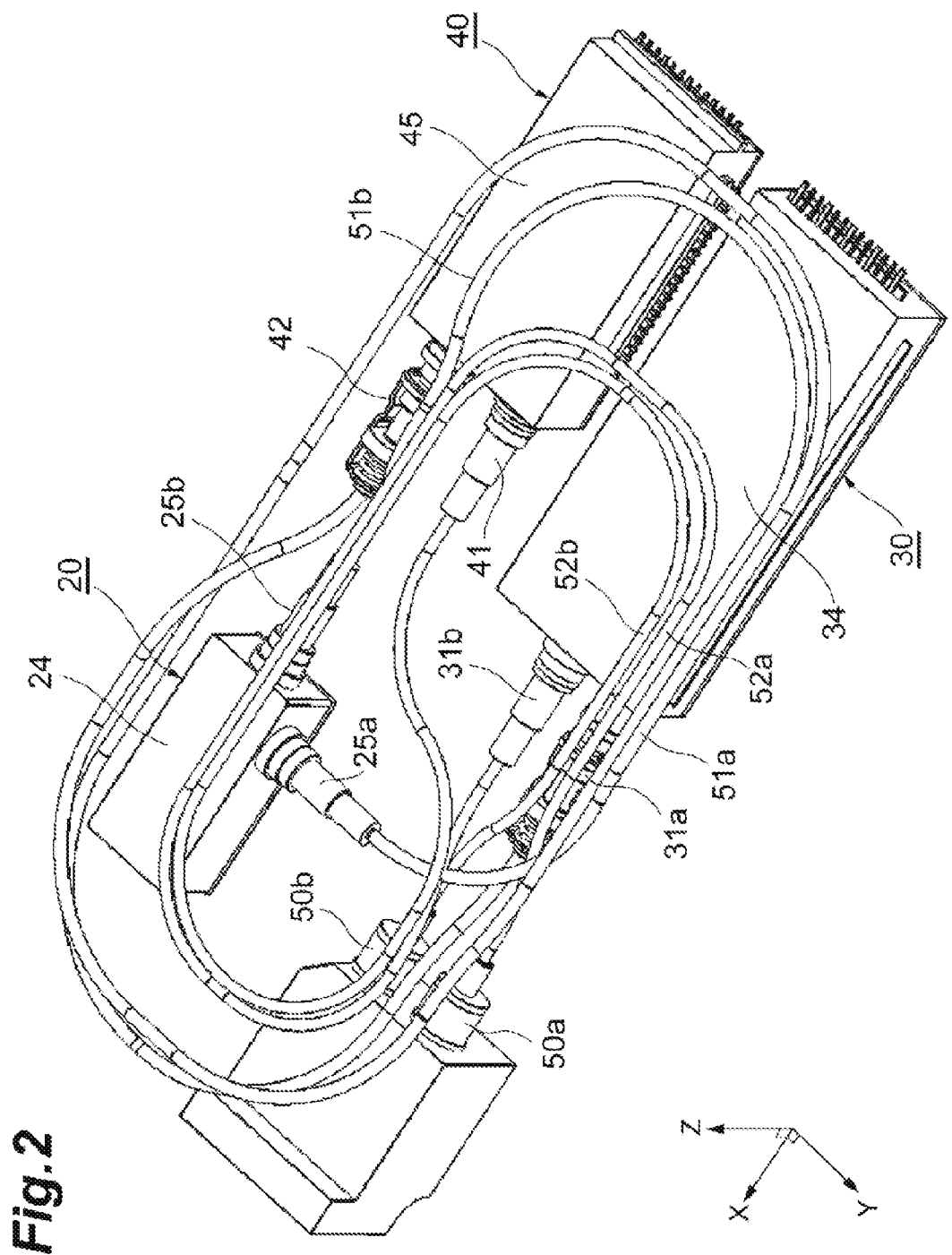
FIG. 2 is a perspective view of the sub-modules, the optical receptacles, and the inner fibers each forming one loop between the modules.

The embodiment shown in FIG. 1 connects the optical receptacles, 50a and 50b, to the output port 31b and the input port 41 by the inner fibers, 52a and 52b, with respective shortest length. However, similar to the inner fibers, 51a and 51b, the inner fibers, 52a and 52b, may have at least one loop between respective ends. For instance, as shown in FIG. 2, which is a perspective view of the modules, 20 to 40, the optical receptacles, 50a and 50b, and the inner fibers, 51a to 52b, but omits the housing 11; the inner fibers, 52a and 52b, form a loop between respective two ends. The inner fiber 52a, which is pulled out from the transmitter optical receptacle 50a, extends along the side 12c to the rear, turns by about 180° in the rear, extends along the other side 12d to the front, and turns again by 180° in the front so as to align the axis thereof with the axis of the output port 31b, and reaches the output port 31b. The other inner fiber 52b, which is pulled out from the receiver receptacle 50b, extends along the side 12c toward the rear, turns by about 180° in the rear, extends along the other side 12d toward the front, and turns again by about 270° in the front so as to align the axis thereof with the axis of the input port 41, and reaches the input port 41.

In the arrangement of the inner fibers, 51a to 52b, the inner fiber 52b shows the minimum curvature in a portion to turn about 270° in the front and to form an S-like shape subsequent to the portion above. However, the inner fibers, 51a to 52b, may secure the minimum curvature of at least 15 mm.

Figure 3:
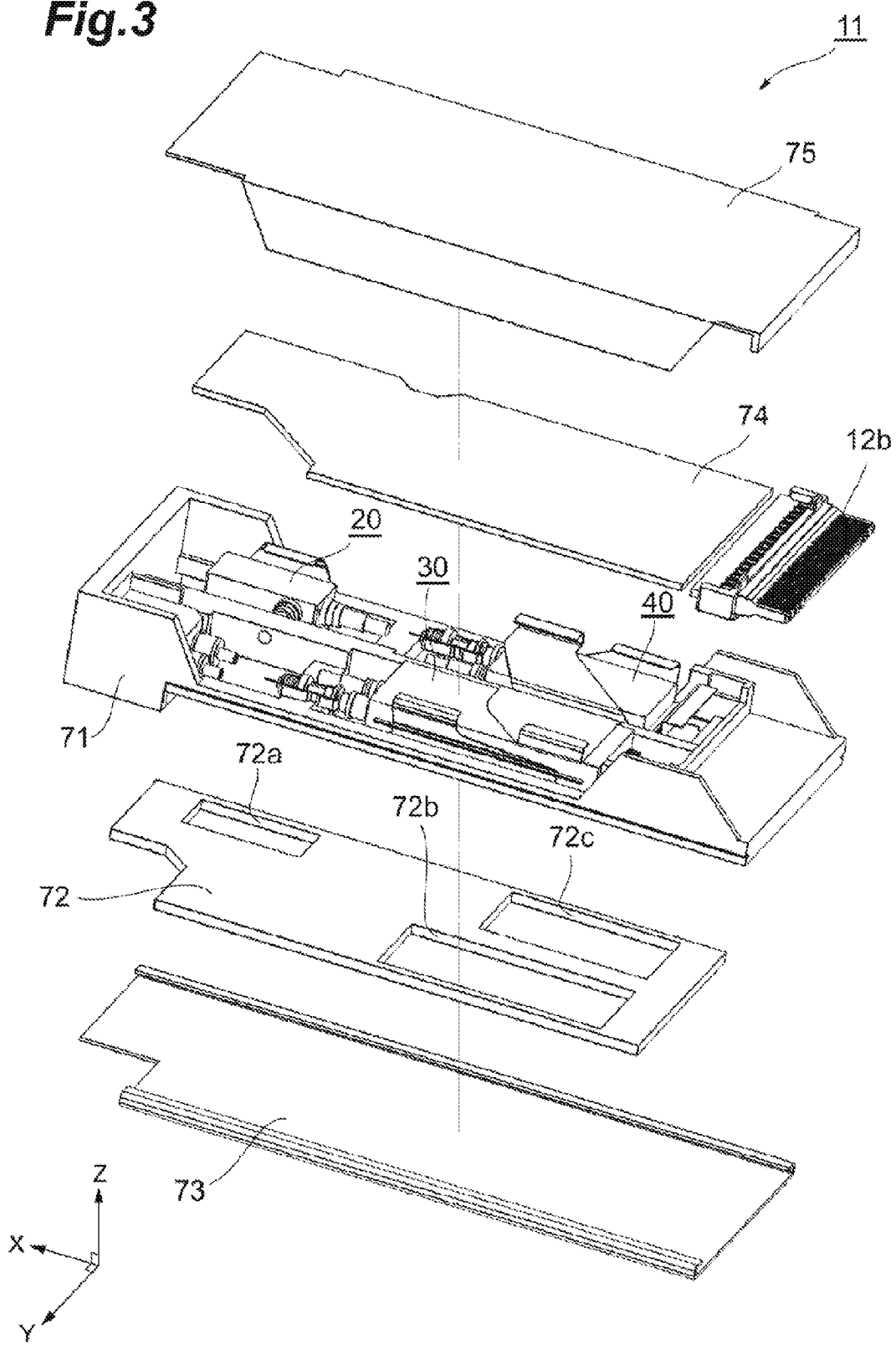
FIG. 3 is an exploded view of the housing.

Next, the inner structure of the optical transceiver 10 will be further described. FIG. 3 is an exploded view of the housing 11, where FIG. 3 omits the inner fibers, 51a to 52b. The housing 11 primarily comprises a frame 71, a bottom plate 72, a bottom cover 73, a printed circuit board (PCB) 74, and a top cover 75. The frame 71 mounts the laser module 20, the transmitter module 30, and the receiver module 40. The bottom plate 72, which is made of metal and assembled with the frame 71 to support the bottom side of the frame 71, has square openings, 72a to 72c, each corresponding to the laser module 20, the transmitter module 30, and the receiver module 40. The bottom cover 73, which is made of metal, is assembled with the bottom plate 72 so as to cover the square openings, 72a to 72c. The laser module 20, the transmitter module 30, and the receiver module 40 are in contact to the bottom cover 73 as passing respective square openings, 72a to 72c, to enhance the heat dissipating.

In an optical transceiver, a transmitter module electrically switches a large current to drive an optical device, typically a semiconductor laser diode, which affects an operation of an optical receiver that converts a weak optical signal into a weak electrical signal. Accordingly, the transmitter module preferably isolates the ground thereof from the ground of the receiver module. The present optical transceiver 1 isolates the receiver housing 45 electrically form the frame 71 by interposing an insulating holder therebetween. Also, the receiver housing 45 is made of material having good thermal conductivity and is in thermally contact with the bottom cover 73 by interposing a thermal sheet, or, a heat-dissipating sheet.

Figure 5:
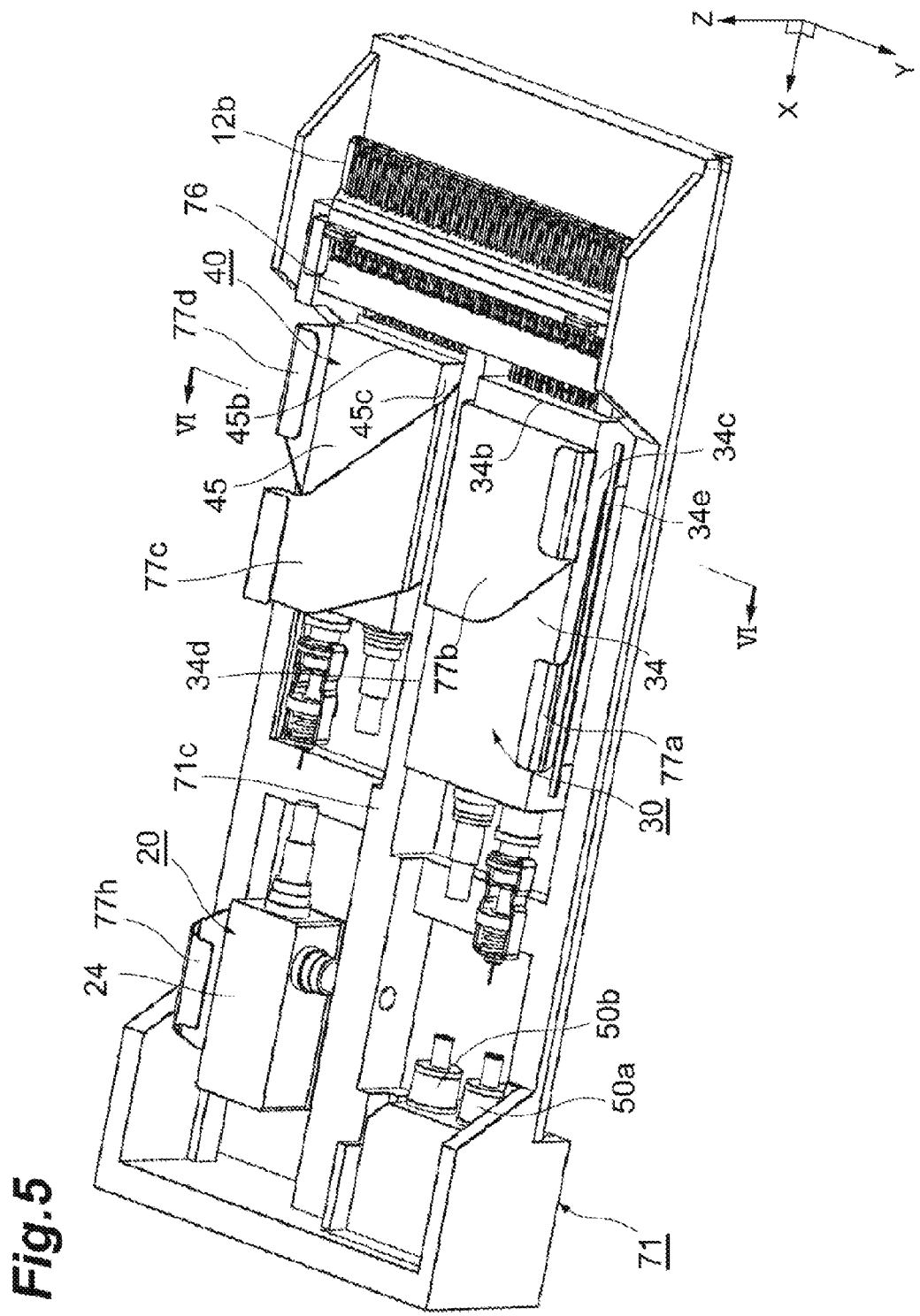
FIG. 5 views the inside of the housing that installs the laser module, the transmitter module, the receiver module, and the optical receptacles.

The PCB 74 mounts electronic circuits thereon. The PCB 74 longitudinally extends from the laser module 20 in the front to the transmitter module 30 and the receiver module 40 in the rear 40. Also, the PCB 74 provides interconnections to be connected to the DC/LF terminals of the laser module 20, and the DC/LF terminals of the transmitter module 30 and the receiver module 40. The PCB 74 is electrically connected to the electrical plug 12b through a relay board 76, which is shown in FIG. 5. The top cover 75 is made of metal, and covers and electrically shields the PCB 74, the laser module 20, the transmitter module 30, and the receiver module 40.

Figure 4:
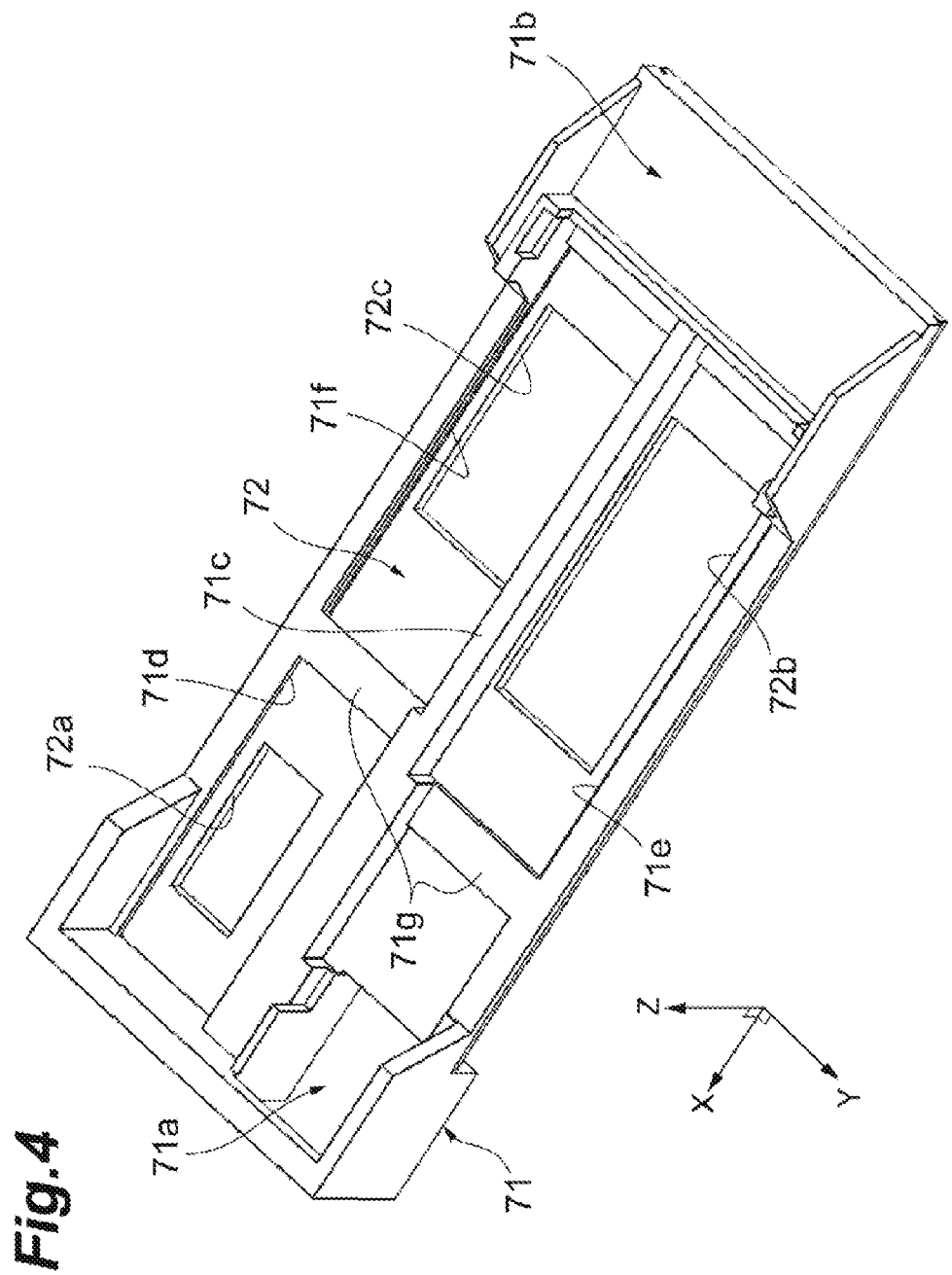
FIG. 4 illustrates the frame and the bottom cover assembled with the frame.

FIG. 4 illustrates the frame 71 and the bottom cover 72. The frame 71, which may be formed by, for instance, metal die-casting, provides a front pocket 71a where the optical receptacles, 50a and 50b, is set and a rear pocket 71b where the electrical plug 12b is set. The frame 71 further provides a center beam 71c, timbers 71g laterally extending from the beam 71c, and three openings, 71d to 71f, surrounded and formed by the beam 71c and the timbers 71g. Each of openings, 71d to 71f, corresponds to respective square openings, 72a to 72c, of the bottom plate 72. The openings, 71d to 71f, have dimensions greater than the dimensions of the square openings, 72a to 72c. Accordingly, the square openings, 72a to 72c, are exposed within the openings, 71d to 71f. The frame 71 preferably provides the beam 71c whose height or thickness is greater than the thickness of the timbers 71g to secure the stiffness of the frame 71.

Figure 6:
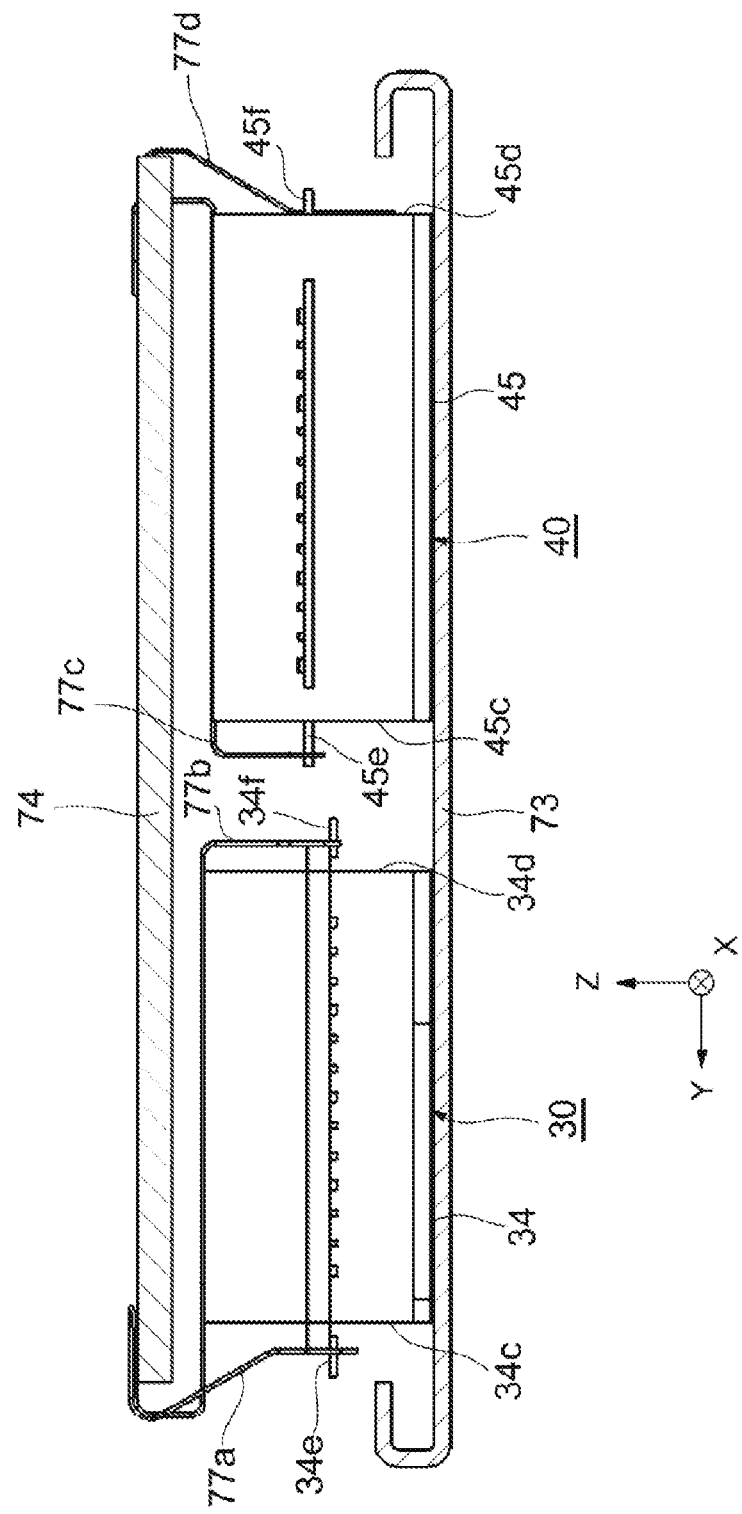
FIG. 6 is a cross section taken along the line VI-VI appearing in FIG. 5.
Figure 7:
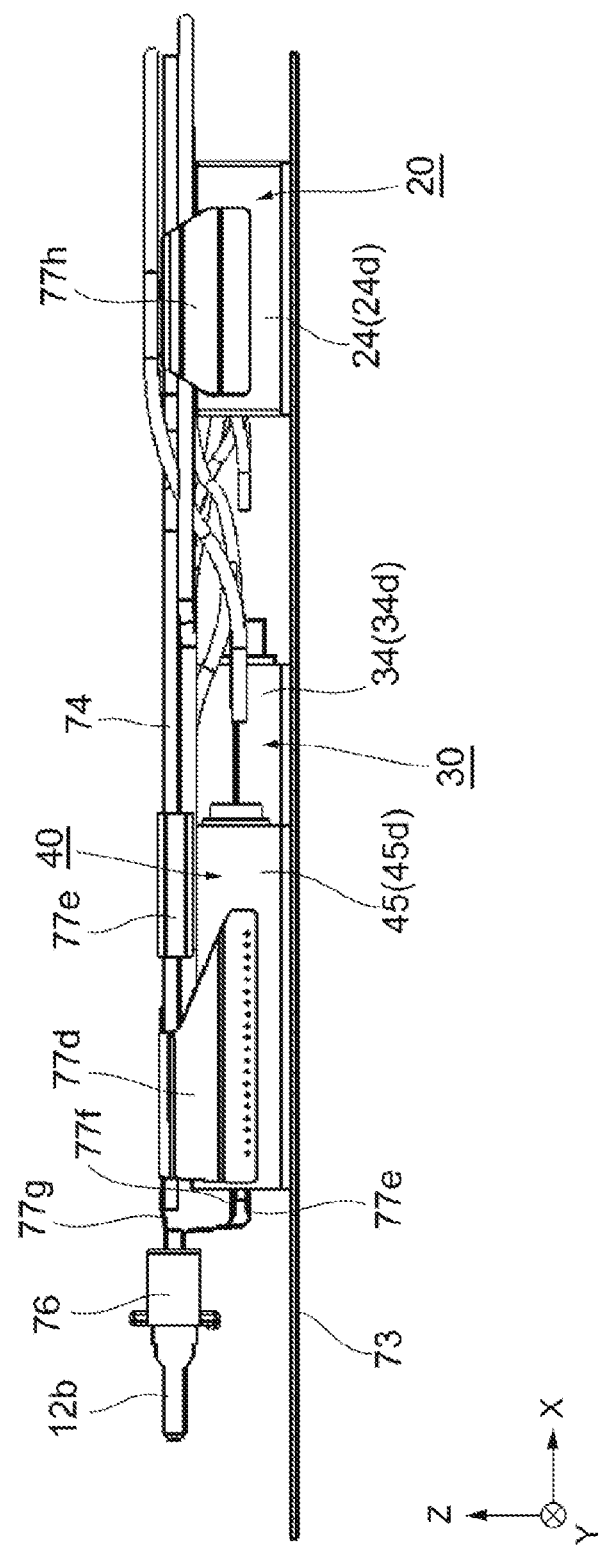
FIG. 7 is a side view of the inside of the housing.

FIG. 5 views the inside of the housing 11 that installs the laser module 20, the transmitter module 30, the receiver module 40, and the optical receptacles, 50a and 50b, in respective positions, but FIG. 5 omits the PCB 74. The transmitter and receiver modules, 30 and 40 implement flexible printed circuit boards (FPC boards). FIG. 6 is a cross section taken along the line VI-VI appearing in FIG. 5. FIG. 7 is a side view of the inside of the housing 11.

As illustrated in FIGS. 5 to 7, the FPCs, 77a to 77b, electrically connect the DC/LF terminals, 34e and 34f, provided in respective sides, 34c and 34d, of the transmitter module 30 to the PCB 74. Other FPCs, 77c and 77d, electrically connect the DC/LF terminals, 45e and 45f, provided in respective sides, 45c and 45d, of the receiver module 40 to the PCB 74. Further, the FPC 77h electrically connects the DC/LF terminals 24e provided in the side 24d of the laser module 20 to the PCB 74. Finally, the PCB 74 is electrically connected to the electrical plug 12b through the FPC 77g and the relay board 76.

On the other hand, the RF terminals provided in the side 34b of the transmitter module 30 is directly connected to the relay board 76 with an FPC 77e as illustrated in FIG. 7 without passing the PCB 74. Similarly, the RF terminals provided in the side 45b of the receiver module 40 is directly connected to the relay board 76 with an FPC 77f without passing the PCB 74. Thus, the RF terminals are directly connected to the relay board 76.

An optical transceiver for the digital coherent system usually processes high frequency signals over 10 GHz. Such signals are readily degraded during the transmission. Accordingly, in the optical transceiver of the embodiment, the transmitter module 30 and the receiver module 40 provide RF terminals only in respective sides, 34b and 45b, facing the electrical plug 12b to transmit RF signals directly to/from the relay board 76 without passing the PCB 74. This arrangement makes the transmission paths for the RF signals short enough compared with an arrangement interposing the PCB 74. Moreover, the present arrangement may reduce the count of nodes or points at which the transmission impedance is disarranged. The DC/LF terminals, 34e, 34f, 45e, and 45f, are connected to the electrical plug 12b through the PCB 74. Signals for DC/LF terminals are substantially independent of the length of the transmission line and the number of the nodes in the transmission line.

The present embodiment makes the laser housing 24, the transmitter housing 34 and the receiver housing 45 in thermally and physically contact to the bottom cover 73 to conduct heat. Accordingly, no spaces are secured between those housing, 24, 34, and 45, and the bottom cover 73 for the inner fibers, 51a to 52b to go through. The inner fibers, 51a to 52b, are set between respective housings, 24, 34, and 45, and the top cover 75. Because the PCB 74 and the FPCs, 77a to 77d, are set between the housings, 24, 34, and 45, and the top cover 75, the inner fibers, 51a to 52b, are necessary to be set in this space so as not to interfere with the PCB 74 and the FPCs, 77a to 77d.

First, the FPCs, 77a to 77d, are set in this space as follows. That is, as illustrated in FIG. 6, two FPCs, 77a and 77d, connected to the DC/RF terminals in respective sides, 34c and 45d, close to the sides walls, 12c and 12d, extend upward, bent by about a right angle, and soldered to the top surface of the PCB 74. The other FPCs, 77b and 77c, connected to respective sides, 34d and 45c, positioned in a center of the housing 11, are also extended upward, bent by about a right angle at the corners of respective housings, 34 and 45, extended in the space between the housings, 34 and 45, and the bottom surface of the PCB 74 to respective side walls, 12c and 12d, folded at respective edges of the PCB 74, and finally soldered on the top of the PCB 74.

Moreover, as illustrated in FIG. 5, the first group of FPCs, 77b and 77d, are connected to the PCB 74 in a portion close to the electrical plug 12b; while, the second group of FPCs, 77a and 77e, are connected to a portion of the PCB 74 close to the laser module 20. Thus, four FPCs, 77a to 77d, are set so as not to interfere with others. The combination of the groups for the FPCs, 77a to 77d, is optional. For instance, an arrangement where two FPCs, 77a and 77d, are connected to the front portion, while, the rest FPCs, 77b and 77c, are connected to the rear portion, may be also applicable in the optical transceiver 10.

The optical transceiver 10 of the embodiment providing the arrangement for the FPCs, 77a to 77d, described above makes a space between respective modules, 30 and 40, and the PCB 74 enough to set the inner fibers, 51a to 52b, therein as forming at least one loop. This space preferably has a depth, namely, a distance between the top of the modules, 30 and 40, and the bottom surface of the PCB 74, of at least twice of the outer diameter of the inner fibers, 51a to 52b. Such depth makes it possible to cross the inner fibers, 51a to 52b, without causing any stress to the inner fibers, 51a to 52b.

The description above concentrates an arrangement for the FPCs, 77b and 77c, connected to respective center sides, 34d and 45c, of the modules, 30 and 40, are set in contact to the top of the modules, 30 and 40. However, the FPCs, 77b and 77c, may be set so as to be in contact with the bottom surface of the FPC 74. Although the FPCs, 77b and 77c, block a portion of the center of the space in this modified arrangement, the inner fibers, 51a to 52b, may be set in another space between the modules, 30 and 40, and the electrical plug 12b so as to avoid the FPCs, 77b and 77c, in the center. Moreover, this arrangement of the FPCs, 77b and 77c, may temporarily arrange the inner fibers, 51a to 52b, by the FPCs, 77b and 77c, during the assembly of the optical transceiver 10.

Next, details of the laser module 20, the transmitter module 30, and the receiver module 40 are explained.

(Laser Module)

Figure 8:
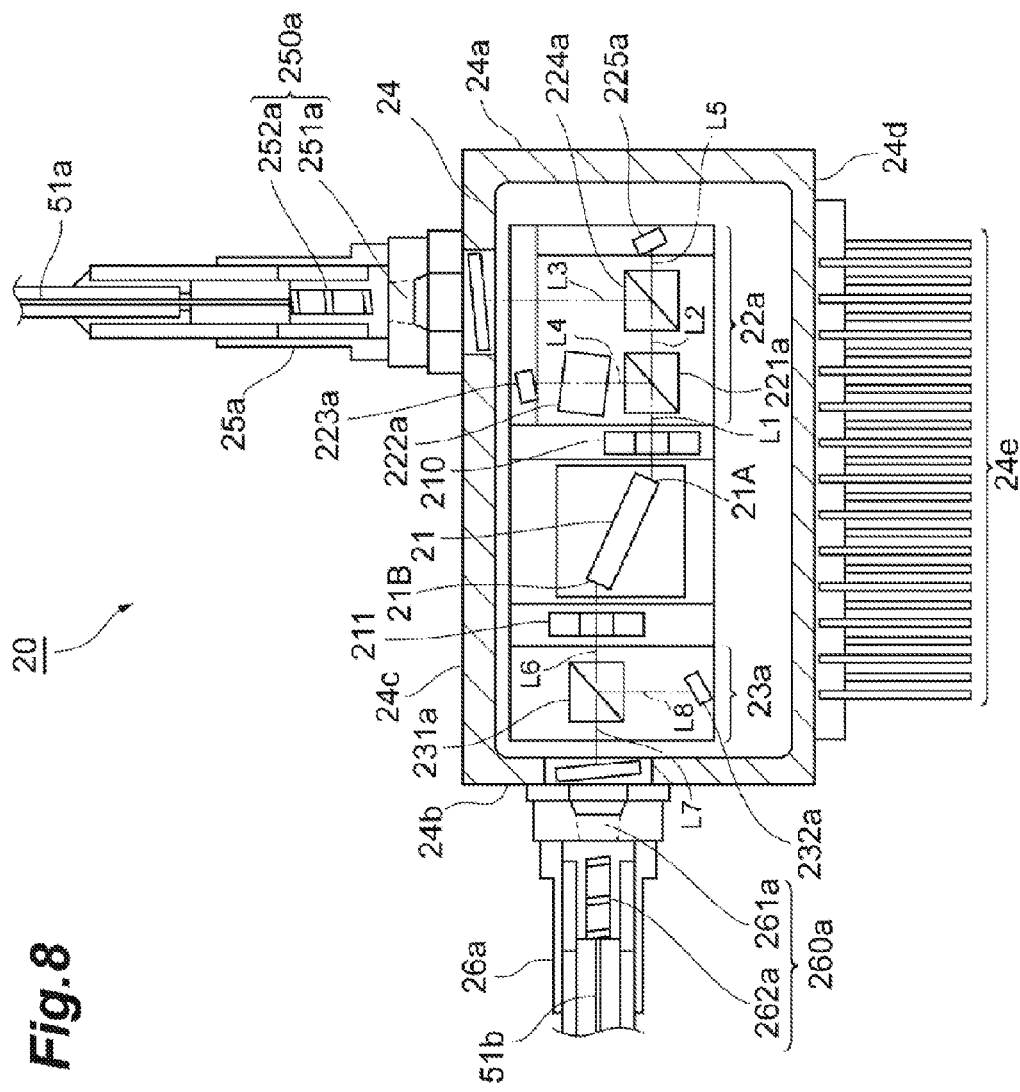
FIG. 8 is a plan view showing an inside of the laser module.

FIG. 8 is a plan view showing an inside of the laser module 20. The laser module 20 installs a wavelength tunable LD 21 that provides two facets 21A and 21B forming an optical cavity. The laser module 20 further includes a wavelength locker 22a optically coupled with the facet 21A and an optical system 23a including a beam splitter (BS) 231a coupled with the other facet 21B. The wavelength locker 22a and the optical system 23a are enclosed within the laser housing 24.

The wavelength locker 22a includes a BS 221a, an etalon filter 222a, and photodiodes (PDs), 223a and 225a. A laser beam L1 output from the facet 21A, which is often called as a back-facet beam, is collimated by a lens 210, and split by the BS 221a into two beams, L2 and L4. One of the beams L4, which is split and bent by a right angle by the BS 221a, passes the etalon filter 222a and enters the PD 223a. The etalon filter 222a inherently shows a wavelength dependent transmittance. The other beam L2, which passes the BS 221a, is split again into two beams, L3 and L5, by the BS 224a. One of the beams L3, bent by a right angle by the BS 224a, enters the inner fiber 51a passing the output port 25a, while, the other beam L5 enters the PD 225a.

The wavelength of the laser beam L1 emitted from the wavelength tunable LD 21 may be determined by a ratio of two beams, L4 and L5, that is, the ratio of the photocurrents, I1a and I2a, namely, I1a/I2a, each proportional to the magnitude of the beams, L4 and L5, and detected by respective PDs, 223a and 225a, denotes the transmittance of the etalon filter 222a. Accordingly, measuring the wavelength dependence of the transmittance of the etalon filter 222a and comparing the ratio of two beams, L4 and L5, the wavelength of the laser beam L1 output from the wavelength tunable LD 21 may be determined. In the embodiment, the ratio I1a/I2a is fed back to the driver for the thermo-electric cooler (TEC), on which the wavelength tunable LD 21 is mounted, or the driver for the wavelength tunable LD 21 that adjusts the driving currents provided to the wavelength tunable LD 21. The temperature of the tunable LD 21, and various elements and parameters of the wavelength tunable LD 21 are adjusted such that the wavelength of the wavelength tunable LD 21 becomes the target wavelength.

The output port 25a includes an optical coupling unit 250a having a focusing lens 251a and an optical isolator 252a. The isolator 252a prevents light from returning to the wavelength tunable LD 21. Light entering the cavity of the wavelength tunable LD 21 behaves as optical noise sources, which drastically degrades the quality of the laser beam output from the wavelength tunable LD 21. The focusing lens 251a in the coupling unit 250a enhances the optical coupling efficiency of the beam L3 with the inner fiber 51a.

The optical system 23a includes a BS 231a and the PD 232a. The laser beam L6 output from the facet 21B of the wavelength tunable LD 21, which is often called as the front facet, and collimated by the collimating lens 211, is split into two beams, L7 and L8. One of the beams L7, which passes the BS 231a, enters the inner fiber 51b as passing through the output port 26a. The other beam L8, which is bent by a right angle by the BS 231a, enters the PD 232a. Accordingly, the PD 232a monitors the magnitude of the laser beam L6 output from the front facet 21B of the wavelength tunable LD 21.

The output port 26a provides an optical coupling unit 260a having a focusing lens 261a and an optical isolator 262a. The optical isolator 262a, same as that 252a provided in the other coupling unit 250a, prevent light generated in outsides of the laser module 20 from returning the tunable LD 21. The focusing lens 261a enhances the optical coupling efficiency of the outgoing beam L7 with the inner fiber 51b.

Figure 9:
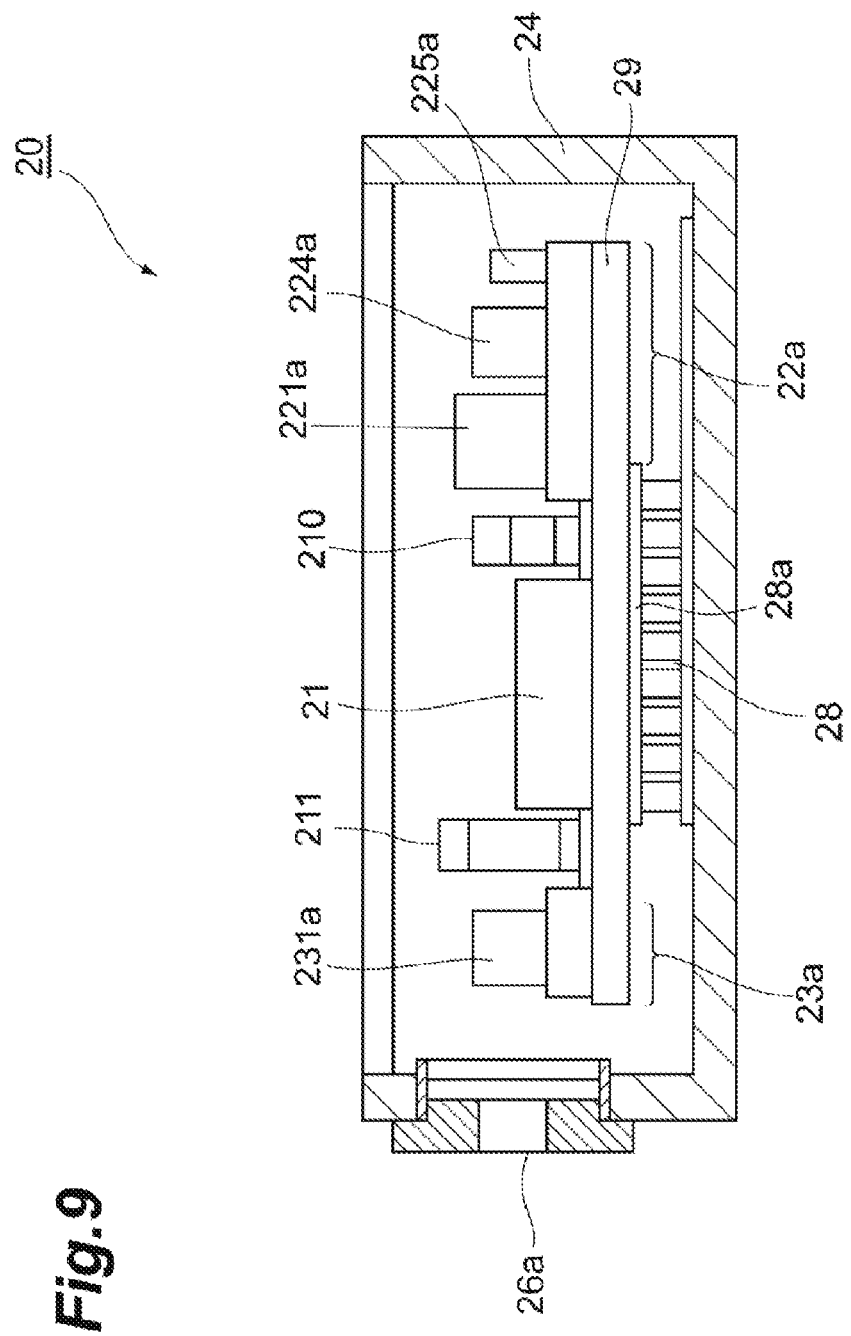
FIG. 9 is a side cross section of the laser module.

FIG. 9 is a side cross section of the laser module 20. The laser module 20 of the embodiment provides, the TEC 28, and a base 29 mounted on the top plate 28a. The base 29 mounts the tunable LD 21, the wavelength locker 22a and the other optical system 23a. The base 29, which has an area wider than an area of the top plate 28a of the TEC 28, extends from the edges of the top plate 28a of the TEC 28. The wavelength tunable LD 21 is mounted in a center area of the base 29 overlapping the top plate 28a, while, the wavelength locker 22a and the optical system 23a are placed in respective areas extending from the edges of the top plate 28a. Accordingly, the TEC 28 primarily controls a temperature of the tunable LD 21. The wavelength locker 22a and the optical system 23a have relatively dull temperature dependence, and show enough performance without controlling the temperature thereof by the TEC 28. Moreover, a narrowed top plate 28a of the TEC 28 results in a lesser number of Peltier elements, which reduces the price/cost of the TEC 28.

Figure 10:
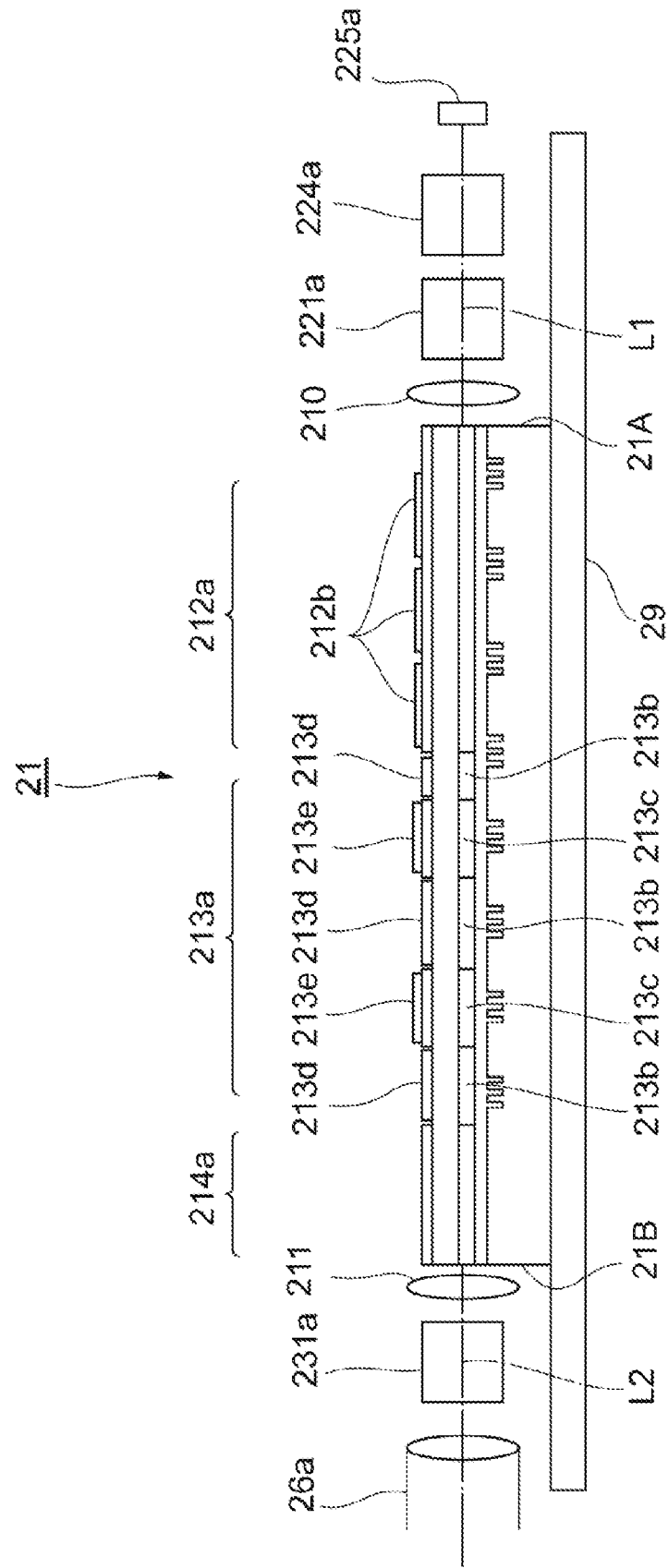
FIG. 10 schematically illustrates a structure of the tunable LD.

FIG. 10 schematically illustrates an inner structure of the wavelength tunable LD 21. The wavelength tunable LD 21 of the embodiment provides three sections, namely, a Chirped Sampled Grating-Distributed Bragg Reflector (CSG-DBR) section 212a, a Sampled-Grating Distributed Feedback (SG-DFB) section 213a, and a semiconductor optical amplifier (SOA) section 214a, arranged in this order along an optical axis of the wavelength tunable LD 21. In a modification, an additional section of a back absorber (BA) may be formed between the CSG-DBR section 212a and one of the facets 21A.

The CSG-DBR section 212a inherently shows a reflectance spectrum with a plurality of reflection peaks; while, the SG-DFB section 213a inherently shows an optical gain spectrum with a plurality of gain peaks. A span between the nearest reflection peaks and a span between the nearest gain peaks are slightly different from others. Modifying the refractive indices of respective sections, 212a and 213a, respective spans and positions of the reflection peaks and the gain peaks are adjustable; and the laser oscillation occurs at a wavelength where one of the reflection peaks becomes coincides with one of the gain peaks.

The CSG-DBR section 212a provides micro-heaters 212b to modify the temperature of micro areas in the CSG-DBR section 212a, which also modifies or varies the refractive index thereat to vary the span between the reflection peaks and the positions of the reflection peaks. On the other hand, the SG-DFB section 213a provides gain areas 213b and modifying areas 213c alternately arranged to each other along the optical axis. Each of areas, 213b and 213c, provides electrodes, 213d and 213e, to inject currents. The current injected into the gain areas 213b generate photons, while, the current injected into the modifying areas 213c modifies the refractive index of the areas 213c to vary the span between the gain peaks and the positions thereof. Thus, varying the micro-temperature in the CSG-DBR section 212a and the refractive index of the modifying areas 213c, a wavelength, at which one of the reflection peaks attributed to the CSG-DBR section 212a and one of the gain peaks attributed to the SG-DFB section 213a matches, appears in a wavelength range. Accordingly, the emission wavelength of the tunable LD 21 may be varied continuously in this wavelength range.

The CSG-DBR section 212a provides a plurality of micro-heaters 212b whose temperatures are independently controllable. This arrangement of the micro-heaters 212b makes it possible to vary temperature distribution of the CSG-DBR section 212a widely and precisely. This means that the wavelength range within which the emission wavelength be tuned may be expanded. For instance, the dense wavelength division multiplexing (DWDM) standard defines the wavelength grids, namely, channel grids with a span of 50 GHz and the number of the wavelength grids of 100 grids in an wavelength range of 192 to 197 THz, which corresponds to the wavelengths of 1.55 μm band. In order to follow such a wide range of the emission wavelengths stably, the wavelength tunable LD 21 of the embodiment provides a plurality of micro-heaters 212b.

The laser module 20 of the embodiment extracts the laser beam L1 output from the facet 21A through the wavelength locker 22a. The split ratio by the BS 221a is preferably determined by the ratio of respective outputs, I1a and I2a, of the PDs, 223a and 225a. The split ratio of the BS 221a is determined such that the laser beam L3 extracted from the output port 25a has magnitude enough to be processed in the transmitter module 30 and the laser beam L4 entering the PD 223a has magnitude to determine the emission wavelength.

(Transmitter Module)

Figure 11:
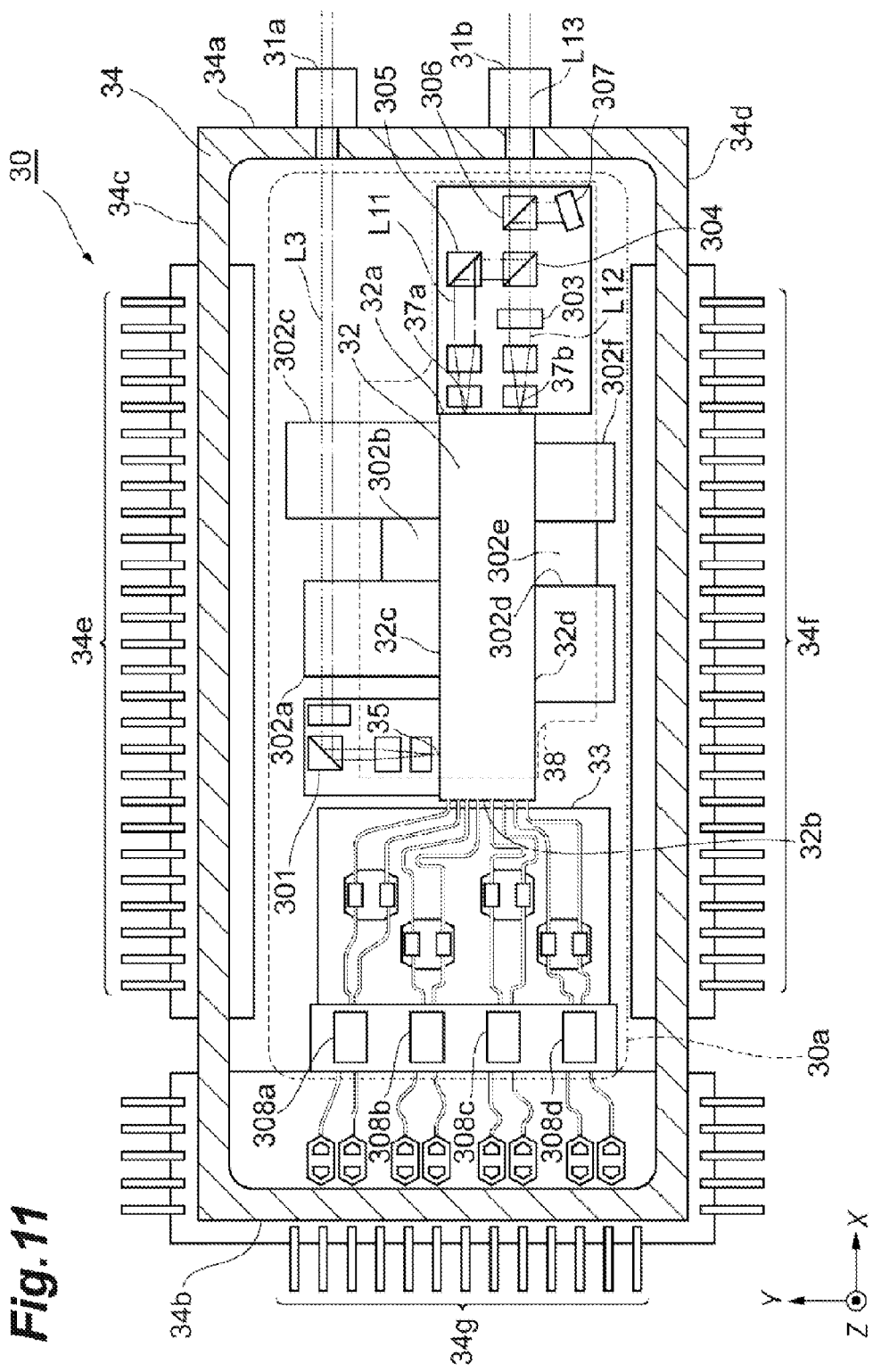
FIG. 11 is a plan view showing an inside of the transmitter module.

FIG. 11 shows an inside of the transmitter module 30. The transmitter module 30 of the embodiment provides an optical transmitter 30a with an optical modulator 32 made of semiconductor material, primarily InP in the present embodiment. A whole of the optical transmitter 30a is enclosed within the transmitter housing 34. The optical modulator 32, receiving the laser beam L3 output from the laser module 20, generates two beams, L11 and L12, by modulating the laser beam L3. The optical modulator 32 has a rectangular plane shape with a longitudinal axis extending in parallel to the longitudinal axis of the module housing 34 and four sides, two of which, 32a and 32b, extends laterally with a length of 2.8 mm, while, other two sides, 32c and 32d, extends longitudinally with a length of 11 mm.

The optical transmitter 30a further includes a wiring substrate 33, a mirror 301, auxiliary substrates, 302a to 302f, and drivers, 308a to 308d.

The mirror 301 and the auxiliary substrates, 302a to 302c, are disposed in a side close to the side 32c of the optical modulator 32; while, other auxiliary substrates, 302d to 302f, are disposed in a side close to the side 32d of the optical modulator 32. The mirror 301 reflects the laser beam L3 coming from the input port 31a provided in the side 34a of the transmitter housing 34 toward the input port 35 provided in the side 32c of the optical modulator 32. That is, an optical path from the input port 31a to the mirror 301 extends longitudinally, while, an optical path from the mirror 301 extends laterally. The auxiliary substrates, 302a to 302c, are arranged along the optical path from the input port 31a to the mirror 301 but underneath the optical path so as not to interfere with the laser beam L3. The input port 31a provides an optical coupling system including a lens to collimate the light coming from the inner fiber 51a.

The auxiliary substrates, 302b and 302c, and the auxiliary substrates, 302e and 302f, are electrically connected to the optical modulator 32. The PDs are mounted on the auxiliary substrates, 302b and 302e, for detecting magnitude of the beam output from the optical modulator 32. The auxiliary substrates, 302c and 302f, provide interconnections on the surfaces thereof to transmit DC/LF signals from the DC/LF terminals, 34e and 34f, to the optical modulator 32. The DC/LF terminals, 34e and 34f, of the transmitter module 30 are not directly connected to the optical modulator 32 with bonding wires but through the interconnections on the auxiliary substrates, 302c and 302f. The DC/LF terminals, 34e and 34f, are wire-bonded to the interconnections on the auxiliary substrates, 302c and 302f, in one ends thereof, and the interconnections in the other end thereof are wire-bonded to the optical modulator 32. This arrangement of the auxiliary substrates, 302c and 302f, may avoid the interference of bonding wires with the laser beam L3 coming from the input port 31a.

The optical transmitter 30a further includes an output coupling system including a half-wave ($\lambda/2$) plate 303, a polarization beam combiner (PBC) 304, a BS 306, a mirror 305, and a PD 307 between the side 32a of the optical modulator 32 and the side 34a of the transmitter housing 34. The side 32a of the optical modulator 32 provides two output ports, 37a and 37b, to output the first modulated beam L11 and the second modulated beam L12, respectively. These two laser beams, L11 and L12, are converted into collimated beams by respective two lenses disposed in front of the output ports, 37a and 37b.

One of the modulated beams L11 is bent by the mirror 305 to reach the PBC 304. The other of the modulated beams L12 output from the port 37b and converted into the collimated beams passes the half-wave plate 303 to rotate the polarization direction thereof by 90° and reaches the PBC 304. That is, two modulated beams, L11 and L12, have respective polarization directions perpendicular to the other at the PBC 304. Accordingly, the PBC may combine two modulated beams to form the combined modulated beam L13. A portion of the combined modulated beam L13 is spilt by the splitter 306 to be detected by the PD 307, while, a primary portion of the beam L13 is output from the output port 31b to the inner fiber 52a. The PD 307 may detect total magnitude of the output beam L13.

In the arrangement of the output optical system described above, the half-wave plate 303 is set for the laser beam L12 not bent by the mirror 305. When the half-wave plate 303 is set for the other laser beam L11 to be bent by the mirror 305 toward the PBC 304, the optical skew inevitably increases depending on the path lengths of respective beams, L11 and L12. An additional means to compensate the optical skew is necessary to be set in the path for the laser beam L12.

The wiring substrate 33, which is put adjacent to the side 32b of the optical modulator 32, electrically connects the drivers, 308a to 308d, with the optical modulator 32. The drivers, 308a to 308d, are electrically connected to the RF terminals 34g provided in the side 34d of the transmitter housing 34. The drivers, 308a to 308d, generate driving signals to drive the optical modulator 32 based on modulation signals provided to the RE terminals 34g. An area 38 surrounded by a broken line appearing in FIG. 11 corresponds to a plane shape of a TEC.

Figure 12:
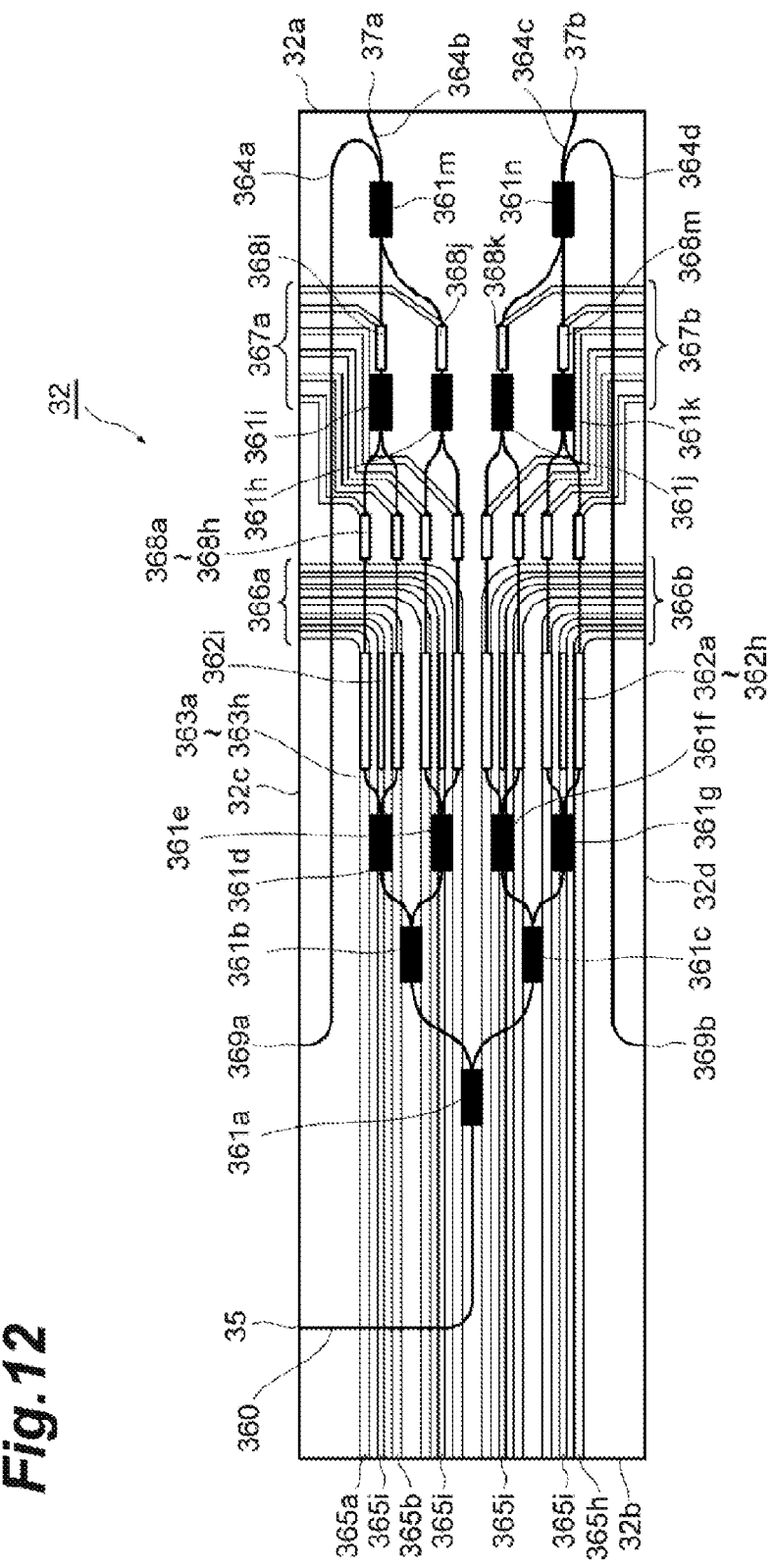
FIG. 12 is a plan view showing the optical modulator.

FIG. 12 is a plan view of the optical modulator 32. The optical modulator 32 has the type of the four Mach-Zehnder (MZ) modulators including eleven (11) 1×2 couples, 361a to 361k, two 2×2 couples, 361m and 361n, eight (8) arm waveguides, 363a to 363h, interconnections, 365a, 365h, ground interconnections 365i, modulation electrodes, 362a to 362h, bias electrodes, 368a to 368m, and ground electrodes 362i. The seven (7) 1×2 couples, 361a to 361g, are placed in three levels to split the input beam provided from the input port 35 in the side 32c into eight (8=23) beams, where they are grouped into four (4) pairs each propagating within the arm waveguides, 363a to 363h.

The arm waveguides, 363a to 363h, where they longitudinally extend along the X-direction, provide respective modulation electrodes, 362a to 362h, and respective pairs of the arm waveguides, 363a to 363h, put the ground electrode 362i therebetween. The modulation electrodes, 362a to 362h, are connected to the interconnections, 365a, 365h, while, the ground electrode 362i is connected to the ground 365i. These interconnections, 365a, 365h, and the ground 365i in respective one ends thereof receive the modulation signals from the drivers, 308a to 308d, at the side 32b. The other ends of the interconnections, 365a, 365h, are drawn to respective electrodes, 366a and 366b, at the sides, 32c and 32d, and connected to respective terminators mounted on the substrates, 302b and 302e, where they are placed adjacent to respective sides, 32c and 32d, as shown in FIG. 11.

The bias electrodes, 368a to 368h and 368i to 368m are provided with DC biases through interconnections, 367a and 367b, drawn to respective sides, 32c and 32d. The bias electrodes, 368a to 368m, receive the bias to adjust the phases of the beams propagating in respective waveguides. Specifically, the bias electrodes, 368a and 368b, provided in the arm waveguides, 363a and 363b, generate the phase offset between the beams each propagating in the arm waveguides, 363a and 363b. The modulation signal provided from the driver 308a includes two signals complementary to each other and has amplitude to delay the phase of the beam propagating in the arm waveguide under the modulation electrode by $\pi$. The bias electrodes, 368a and 368b, are provided with biases to cause the phase offset of $\pi$ between two beams each propagating in the arm waveguides, 363a and 363b, where the beam propagating in the arm waveguide 363a is assumed to be delayed by $\pi$ against the other beam propagating in the other arm waveguides, 363b. Then, when the modulation electrode 362a receives the modulation signal with the maximum amplitude and the modulation electrode 362b receives the signal with the minimum amplitude or substantially zero level, the beam propagating in the arm waveguide 363a is delayed by $\pi$ but the other beam propagating in the other arm waveguide 363b is left unchanged. Thus, the beam propagating in the arm waveguide 363a is delayed against the other beam in the arm waveguide 363b by $\pi+\pi=2\pi$, and the beam combined by the 1×2 coupler 361i has the phase delay of zero.

On the other hand, when the modulation signal applied to the modulation electrode 362a becomes the minimum or zero, while, the other modulation signal applied to the other electrode 362b becomes the maximum, the offset bias applied to the bias electrode 368a only contributes the phase delay of the beam propagating in the arm waveguide 363a, which becomes $\pi$. The beam propagating in the other arm waveguide 363b is delayed by the modulation signal 365b by $\pi$. Thus, the beam combined by the 1×2 coupler 361i has the phase delay of $\pi$. Accordingly, the differential modulation signal applied to the modulation electrodes, 362a and 362b, and the offset bias applied to the bias electrodes, 368a and 368b, may modulate the phase of the beam split by the 1×2 couplers, 361a, 361*b* and 361*d*, and combined by the 1×2 coupler 361*i*. Other pairs of the arm waveguides, 363*c* and 363*d*, 363*e* and 363*f*, 363*g* and 363*h*, accompanied with respective modulation electrodes, 362*c* to 362*h*, and the bias electrodes, 368*c* to 368*h*, show the same function described above. Thus, the optical modulator 32 may generate four optical signals each modulated by respective modulation signals provided from the drivers, 308*a* to 308*d*.

The beams combined by the 1×2 couplers, 361*i* and 361*h*, are further offset by the signals applied to the bias electrodes, 368*i* and 368*j*. That is, the signal applied to the bias electrodes, 368*i* and 368*j*, causes the phase offset by $\pi/2$ between two beams propagating in respective waveguides. Assuming the beam propagating in the waveguide pulled out from the 1×2 coupler 368*j* is delayed by $\pi/2$, the beam propagating in the waveguide pulled out from the 1×2 coupler 368*i* corresponds to the I-component; while, the beam in the waveguide output from the other coupler 368*j* corresponds to the Q-component. The 2×2 coupler 364*m* combines these two beams and outputs them in the output waveguides, 364*a* and 364*b*. The latter output waveguide 364*b* is terminated in the output port 37*a* in the side 32*a*, while, the former output waveguide 364*a* returns to the input portion and terminates at the monitor port 369*a* in the side 32*c*. The same situation appears in the other two waveguides pulled out from the 1×2 couplers, 368*k* and 368*m*; and the 2×2 coupler 361*n* extracts two output waveguides, 364*c* and 364*d*, the former of which is terminated in the output port 37*b* in the side 32*a*, and the latter is pulled to the input portion and terminated at the monitor port 369*b* in the side 32*d*. The monitor PDs are mounted on respective auxiliary substrates, 302*a* and 302*d*, placed adjacent to the sides, 32*c* and 32*d*.

Figure 13:
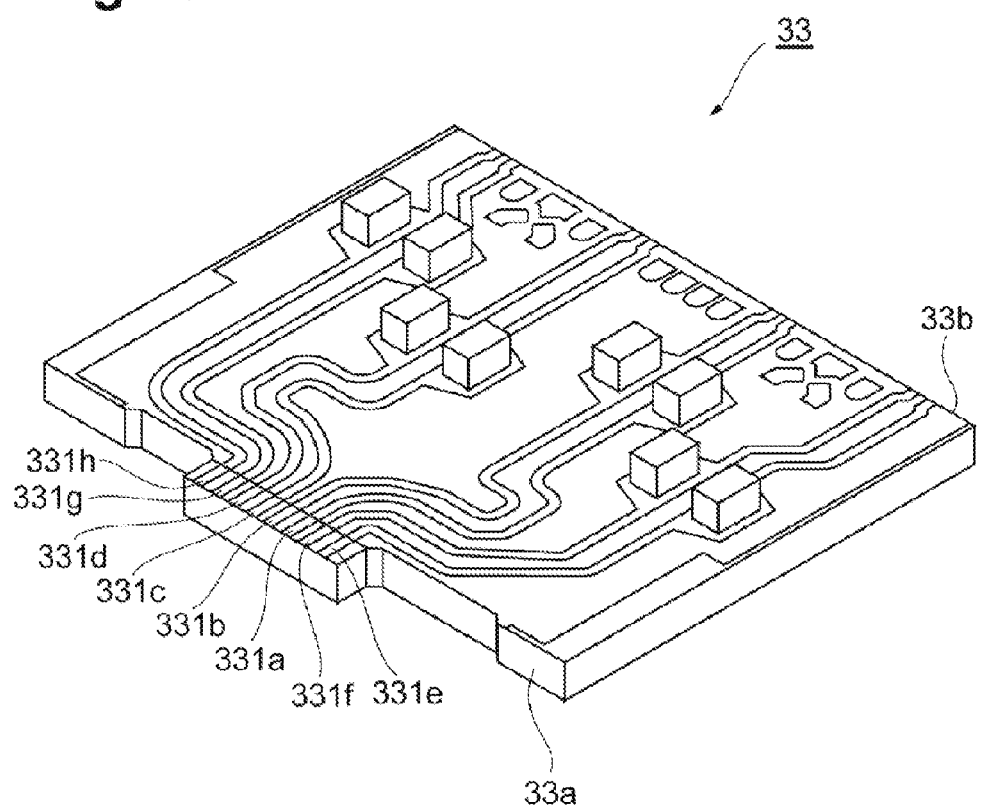
FIG. 13 is a perspective view showing the wiring substrate.

As described above, the interconnections, 365*a*, 365*h*, receive the modulation signals in one ends thereof at the side 32*b* through the wiring substrate 33. FIG. 13 is a perspective view showing the wiring substrate 33 that provides the sides, 33*a* and 33*b*, and eight (8) interconnections, 331*a* to 331*h*, extend from the side 33*a* to the other side 33*b*. The interconnections, 331*a* to 331*h*, are converted at the side 33*a* facing the side 32*b* of the optical modulator 32, that is, respective ends, 331*a* to 331*h*, are electrically connected to the ends of the interconnections, 365*a*, 365*h*, on the optical modulator 32. The other ends of the interconnections, 331*a* to 331*h*, are connected to respective drivers, 308*a* to 308*d*. As shown in FIG. 13, respective interconnections, 331*a* to 331*h*, have length substantially equal to each other by bending them in the outer sides to compensate the electrical skews between the modulation signals.

(Receiver Module)

Figure 14:
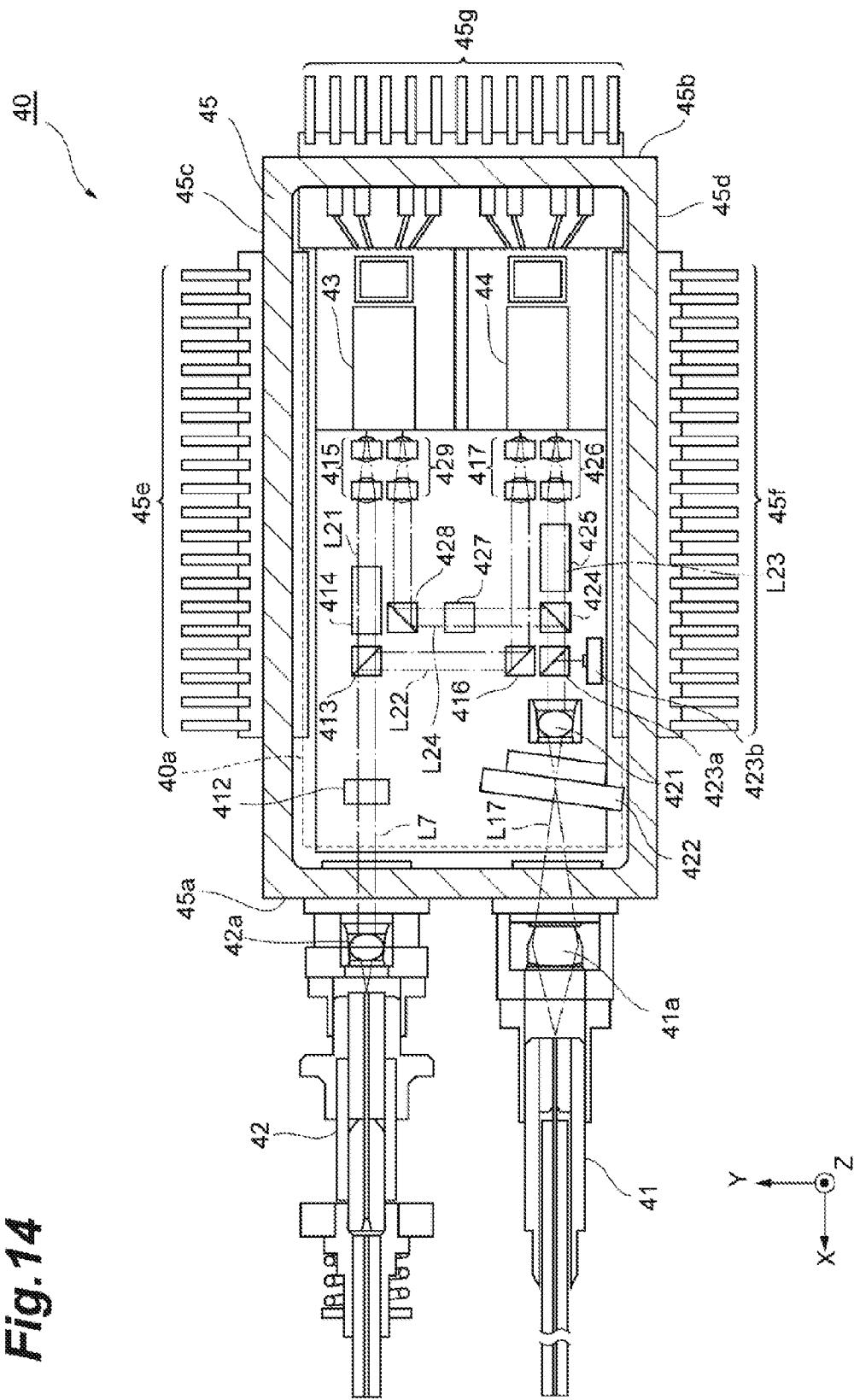
FIG. 14 is a plan view of an inside of the receiver module.

FIG. 14 is a plan view of an inside of the receiver module 40. The receiver module 40 includes the receiver housing 45 and an optical receiver 40*a* installed therein. The optical receiver 40*a* provides two optical coupling systems and two optical hybrids, 43 and 44. One of the optical coupling system is for the local beam L7 coming from the laser module 20; while the other is for the signal beam L17 coming from the receiver optical receptacle 50*b*.

The first coupling system for the local beam L7 includes a polarizer 412, a BS 413, a delay element 414, a lens system 415, a mirror 416, and another lens system 417. The local beam L7 coming from the laser module 20 through the inner fiber 51*b* and entering the input port 42, is collimated by the collimating lens 42*a*, then, arranged in the polarization thereof by the polarizer 412. Although the laser module 20 inherently provides the local beam with the arranged polarization, transmission medium between the laser module 20 and the receiver module 40 possibly disarranges the polarization. Accordingly, the polarizer 212 rearranges the polarization of the local beam L7. The local beam L7 output from the polarizer 412 is evenly split into two beams, L21 and L22. One of the beams L21 passing the BS 413 passes the delay element 414 and enters the optical hybrid 43 as being concentrated with the lens system 415. The other beam L22, reflected by the BS 413 toward the signal beam L17, is reflected again by the mirror 416, advances substantially in parallel to the signal beam L17, enter the other optical hybrid 44 as being concentrated by the lens system 417.

The second coupling system for the incoming optical signal L17 includes a collimating lens 421, a variable optical attenuator (VOA) 422, a BS 423*a*, a monitor PD 423*b*, a polarization beam splitter (PBS) 424, a delay element 425, a lens system 426, a half-wave plate 427, a mirror 428, and another lens system 429. The incoming optical signal L17, which comes from the optical receptacle 50*b* through the inner fiber 52*b* enters the input port 41, is concentrated by the lens 41*a* in the input port 41 to pass the VOA 422. The VOA 422 attenuates the magnitude of the incoming optical signal L17. The collimating lens 421 collimates thus attenuated incoming optical signal L17. The first BS 423*a* splits a portion of the incoming optical signal L17 toward the monitor PD 423*b*, while, a primary portion of the incoming optical signal L17 is evenly split by the second BS 424. The monitor PD 423*b* may control the attenuation of the VOA 422. One of the split beam L23, passing the BS 424 enters the delay element 425, then, enters the optical hybrid 44 as being concentrated by the lens system 426. The other beam L24 reflected by the BS 424 passes the half-wave plate 427. The half-wave plate 427 rotates the polarization thereof by a right angle. The optical signal L24 passing the half-wave plate 427 is reflected again by the mirror 428, then, enters the other optical hybrid 43 after being concentrated by the lens system 429. Thus, one of the signal beams L23 entering the optical hybrid 44 and the other of the signal beams L24 entering the other optical hybrid 43 each has the polarization direction perpendicular to the other.

The coupling system thus described provides the delay element 414 for the local beam L21 and another delay element 425 for the signal beam L23. These two delay elements, 414 and 425, may adjust phase skews between two local beams, L21 and L22, and between two signal beams, L23 and L24. The local beam L22 and the signal beam L24 enter the optical hybrids, 44 and 43, after advancing between the BS 413 and the mirror 416, and between the BS 424 and the mirror 428. That is, the optical path lengths for the beams, L22 and L24, are longer than the other beams, L21 and L23, passing respective BSs, 413 and 424, which causes a phase delay in the beams, L22 and L24. Two delay elements, 414 and 425, causes respective phase delay substantially equal to the delays for the beams, L22 and L24; accordingly, the beams, L21 to L24, entering the optical hybrids, 41 and 43, align the phases thereof. The delay elements, 414 and 425, may be made of, for instance, silicon (Si).

The polarizer 412 set in the path for the local beam L7 has the function to arrange the polarization direction of the local beam L7. This is because, as already described, the laser module 20 may output the local beam L7 with an arranged polarization but the transmission medium such as inner fiber 51*b*, the output port 25*b*, the input port 42, and so on, possibly disarranges the polarization. In addition, the tunable LD 21 in the laser module 20 may not output laser beam with the linear polarization. Although the wavelength tunable LD 21 may output a laser beam with the polarization direction primarily in parallel to the active layer of the wavelength tunable LD 21 but the laser beam inherently has a polarization component perpendicular to the active layer. Accordingly, the polarizer 412 preferably removes this polarization component perpendicular to the active layer.

The polarizer 412 may be substituted to other optical elements. For instance, a quarter-wave plate may convert the elliptical polarization into the linear polarization. Inserting the quarter-wave plate between the collimating lens 42a and the BS 413 instead of the polarizer 412, or inserting the half-wave plate in addition to the quarter-wave plate between the collimating lens 42a and the BS 413, the same function with the polarizer may be realized.

The optical hybrid 43 may extract information from the signal beam L24 by multiplying the signal beam L24 with the local beam L21. Specifically, the optical hybrid 43 may extract the I-component (In-phase component) and the Q-component (Quadrature-phase component) from the signal beam L24 and outputs respective components by differential signals. Similarly, the other optical hybrid 44 may extract the I-component and the Q-component from the signal beam L23 by multiplying the signal beam L23 with the local beam L22. The optical hybrid 44 may also output two differential signals.

Figure 15A:
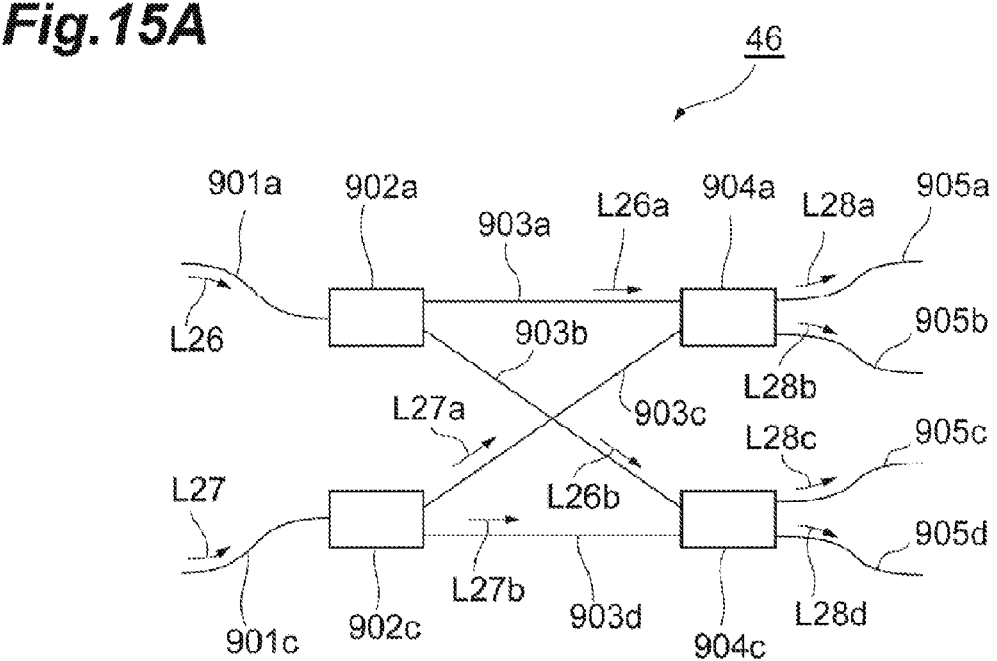
FIGS. 15A and 15B schematically show examples of the optical hybrids.
Figure 15B:
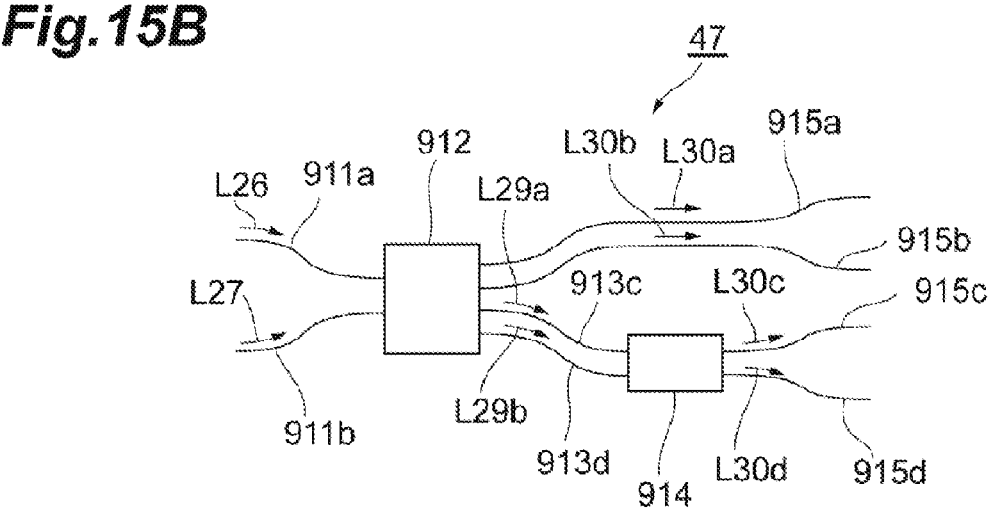

FIGS. 15A and 15B schematically show examples of the optical hybrids, 43 and 44. The optical hybrid 46 shown in FIG. 15A provides two input waveguides, 901a and 901c, two 1×2 couplers, 902a and 902c, two 2×2 couplers, 904a and 904c, four arm waveguides, 903a to 903d, and two pairs of output waveguides, 905a and 905b, 905c and 905d, respectively. The arm waveguides, 903a to 903d, optically couple the 1×2 couplers with the 2×2 couplers. The pair of output waveguides, 905a and 905b, is coupled with the 2×2 coupler 904a, while, another pair of output waveguides, 905c and 905d, is coupled with the other 2×2 coupler 904c.

The input waveguide 901a provides the local beam L26, which is same with the local beam L21 or L22 in FIG. 14, while, the other input waveguide 901c provides the signal beam L27, which is same with the signal beam L23 or L24 in FIG. 14. The local beam L26 is split into two beams, L26a and L26b, by the 1×2 coupler 902a, while, the signal beam L27 is also split into two beams, L27a and L27b, by the other 1×2 coupler. Two beams, L26a and L26b, pass respective arm waveguides, 903a and 903b, to reach respective one input port of the 2×2 couplers, 904a and 904c. Similarly, the signal beam L27 is split into two beams, L27a and L27b, pass respective arm waveguides, 903c and 903d, and reach respective input ports of the 2×2 couplers, 904a and 904c.

The 2×2 coupler 904a interferes the local beam L26a with the signal beam L27a and generates two beams, L28a and L28b, whose phases are different by π (180°), to provide in respective output waveguides, 905a and 905b. Similarly, the local beam L26b is interfered with the signal beam L27b by the other 2×2 coupler 904c. The 2×2 coupler 904c generates two beams, L28c and L28d, to provide them in respective output waveguides, 905c and 905d. Putting a 90° phase shifter, which is not shown in the figures, on at least one of the arm waveguides, for instance, on the arm waveguide 903c, the phase of the pair of the beams, L28a and L28b, becomes different by π/2 against the other pair of the beams, L28c and L28d. Then, the pair of the beams, L28c and L28d, only includes the Q-component, while, the other pair of the beams, L28a and L28b, only contains the I-component. Thus, four output beams, L28a to L28d, contain the I-component of the phase 0, the I-component of the phase π, the Q-component of the phase π/2, and the Q-component of the phase 3π/2, respectively. The I-component and the Q-component may be extracted at the same time.

FIG. 15B schematically shows another example of the optical hybrid. The optical hybrid 47 shown in FIG. 15B has a feature that a 2×4 coupler is coupled in series to a 2×2 coupler. Specifically, the optical hybrid 47 includes two input waveguides, 913c and 913d, a 2×4 coupler 912, a 2×2 coupler 914, two arm waveguides, 913c and 913d, and two pairs of output waveguides, 915a and 915b, 915c and 915d. The two input waveguides, 911a and 911b, couples with respective input ports of the 2×4 coupler 912. One of pairs of output ports of the is coupled with the pair of the output waveguides, 915a and 915b, while, the other of the pair of output ports of the 2×4 coupler 912 couples with the pair of input ports of the 2×2 coupler 914 through respective arm waveguides, 913c and 913d. Two output ports of the 2×2 coupler 914 are coupled with the rest of the output waveguides, 915c and 915d, respectively.

The input waveguide 911a receives the local beam L26, which corresponds to the aforementioned local beams, L21 and L22; while, the other input waveguide 911b receives the signal beam L27. Two beams, L26 and L27, enters the 2×4 coupler 912 and two pairs of the beams, L30a and L30b, L29a and L29b, are generated therein. Two beams, L30a and L30b, have a phase difference of π, similarly, other two beams L29a and L29b; also have a phase difference of π. The latter two beams, L29a and L29b, enter the 2×2 coupler 914 through respective arm waveguides, 913c and 913d. The 2×2 coupler 914 generates two beams, L30c and L30d, in the output waveguides, 915c and 915d. The generated two beams, L30c and L30d have a phase difference of π by multiplexing the beam L29a with the other beam L29b.

One of the arm waveguides, 913c and 913d, provides a phase shifter to shift a phase of a beam propagating therein. Accordingly, the output beams, L30c and L30d, provide only Q-component. On the other hand, rest of beams, L30a and L30b, which are directly output from the 2×4 coupler 912 contain only I-component. That is, four output beams, L30a to L30d, contain the I-component of the phase 0, the I-component of the phase π, the Q-component of the phase π/2, and the Q-component of the phase 3π/2. Thus, the all components contained in the signal beam L17 may be extracted at the same time.

The optical hybrid, 46 and/or 47, which has a dimension of, for instance, 20 μm×500 μm, includes mesa shaped waveguides made of InGaAs formed on an InP substrate. The InGaAs mesas for the waveguides are buried in respective sides thereof by InP. Because InP has relatively smaller refractive index compared with that of Si, the optical hybrid, 46 and/or 47, having such small dimensions may be available.

Figure 16:
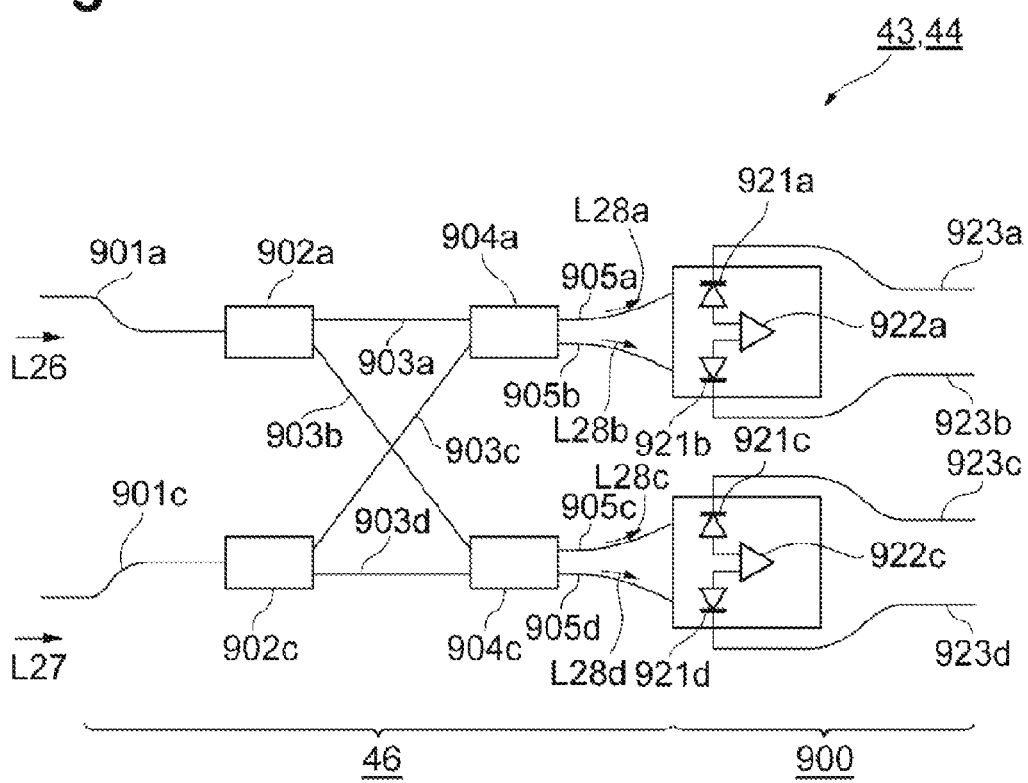
FIG. 16 shows a functional block diagram of a multi-mode interferometer.

FIG. 16 shows a functional block diagram of the optical hybrids, 43 and 44. FIG. 16 assumes that the optical section in the optical hybrid has an arrangement illustrated in FIG. 15A, but the optical hybrids, 43 and 44, may implement with the optical unit shown in FIG. 15B. The optical hybrids, 43 and 44, shown in FIG. 16 further provide a conversion unit 900 optically coupled with respective output waveguides, 905a to 905d, in the optical unit 46 to receive the output beams, L28a to L28d. The conversion unit 900 has four PDs, 921a to 921d, and two trans-impedance amplifiers (TIAs), 922a and 922c, that is, the conversion unit 900 provides two sets of an optical receiver each including a pair of PDs, 921a and 921b, 921c and 921d, and a TIA, 922a and 922c. The PDs, 921a to 921d, are negatively biased in the cathode thereof through respective interconnections, 923a to 923d; while the anode of the PDs, 921a to 921d, are coupled with respective inputs of the TIAs 922a and 922c.

As explained, two laser beams, L28a and L28b have a phase difference of π, and other two laser beams, L28c and L28d, also have a phase difference of π. Accordingly, the TIAs, 922a and 922b, may receive respective two signals complementary to each other and amplify them differentially. The TIA 922a may output signals complementary to each other corresponding to the I-component of the signal beam, while, the TIA 922c may also output signal complementary to each other corresponding to the Q-component of the signal beam. These two outputs will be electrically processed by, for instance, a processor put in downstream of the TIAs, 922a and 922c.

Figure 17A:
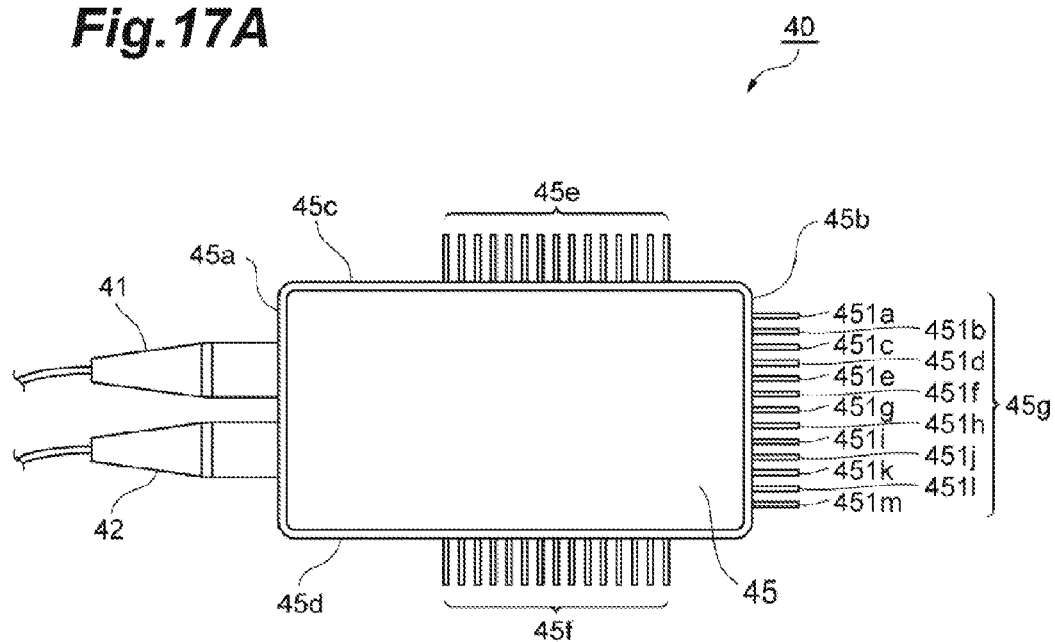
FIGS. 17A and 17B show an outer appearance of the receiver module.
Figure 17B:
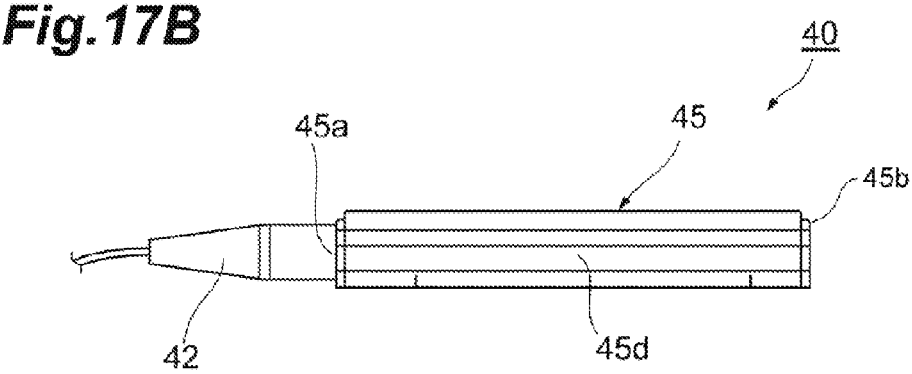

Next, practical dimensions or sizes of the receiver module 40 will be described. FIG. 17 shows an outer appearance of the receiver module 40. The receiver housing 45 has a rectangular shape with a length of 25~33 mm, a width of 16 mm, and a height of 6.5 mm. The receiver housing 45 provides the input ports, 41 and 42, in the lateral side 45a, the RF terminals, 45g in the side 45b opposite to the former one, and the DC/LF terminals, 45e and 45f, in rest sides, 45c and 45d, connecting aforementioned two sides, 45a and 45b. The embodiment provides a total of 43 terminals including 13 RF terminals, 451a to 451m, and respective 15 DC/LF terminals, 45e and 45f. Among 13 RF terminals, 8 RF terminals, 451b, 451c, 451e, 451f, 451h, 451i, 451k, and 451l, differentially output I- and Q-components of the X polarization and I- and Q-components of the Y polarization. Rest of RF terminals, 451a, 451d, 451g, 451j, and 451m, are arranged between the signal terminals above described, and secured in the ground potential. Denoting differential signals as Sg and /SG, respectively, and the ground as G, the RF terminals 45g described above are denoted as G, Sg, /Sg, G, Sg, /Sg, G, Sg, /Sg, G, Sg, /Sg, G. The DC/RF terminals, 45e and 45f, prepared for providing DC power supplies, DC biases, the ground, and so on. These DC/RF terminals, 45e and 45f, include terminals for supplying biases to the PDs, 921a to 921d, coupled with interconnections, 923a to 923d, shown in FIG. 16; terminals for supplying power to the TIAs, 922a and 922c and so on.

Functions available in the full duplex optical transceiver 10 will be described. As already explained, when an optical transceiver implements the digital coherent function, a local optical source for the receiver module is required in addition to the optical signal source for the transmitter module. The requirement of two optical sources sometimes prevents the optical transceiver from being formed in compact. For instance, one of standards for optical transceivers called as CFP2 is hard to realize the full duplex optical transceiver applicable to the digital coherent communication.

The full duplex optical transceiver 10 of the present embodiment implements one tunable LD 21 that provides laser light L3 to the transmitter module 30 to transmit modulated signal light in the transmitting optical fiber, and laser light L7, which is called as the local light, to the receiver module 40 to extract information from received light L17 transmitting through another optical fiber by multiplexing with the local light L7. Thus, the present optical transceiver 10 implements only one tunable LD 21, which enables to realize a full duplex optical transceiver applicable to the digital coherent communication with a housing following the CFP2 standard.

Moreover, the laser module 20 outputs the light L13 to the transmitter module 30 extracted from the front facet 21A of the tunable LD 21, while, the local light L7 to the receiver module 40 extracted from the rear facet 21B of the tunable LD 21. This arrangement makes it possible to form the housing 11 of the optical transceiver 10 in further compact.

The inner fibers, 51a to 51b, coupling the laser module 20 with the transmitter module 30 and the receiver module 40 preferably have at least one loop. Such arrangements of the inner fibers, 51a to 51b, may release stresses possibly caused in the inner fibers, 51a to 51b, and secure the function to maintain the polarization of light transmitting therein.

Also, the inner fibers, 51a and 51b, extend from the laser module 20 in respective directions perpendicular to each other. That is, the laser module 20 has optical output ports, 25a and 26a, in respective sides perpendicular to each other. This arrangement may form the housing 11 of the optical transceiver 10 is further compact, in particular, the length of the housing 11 may be shortened.

Second Embodiment

Figure 18:
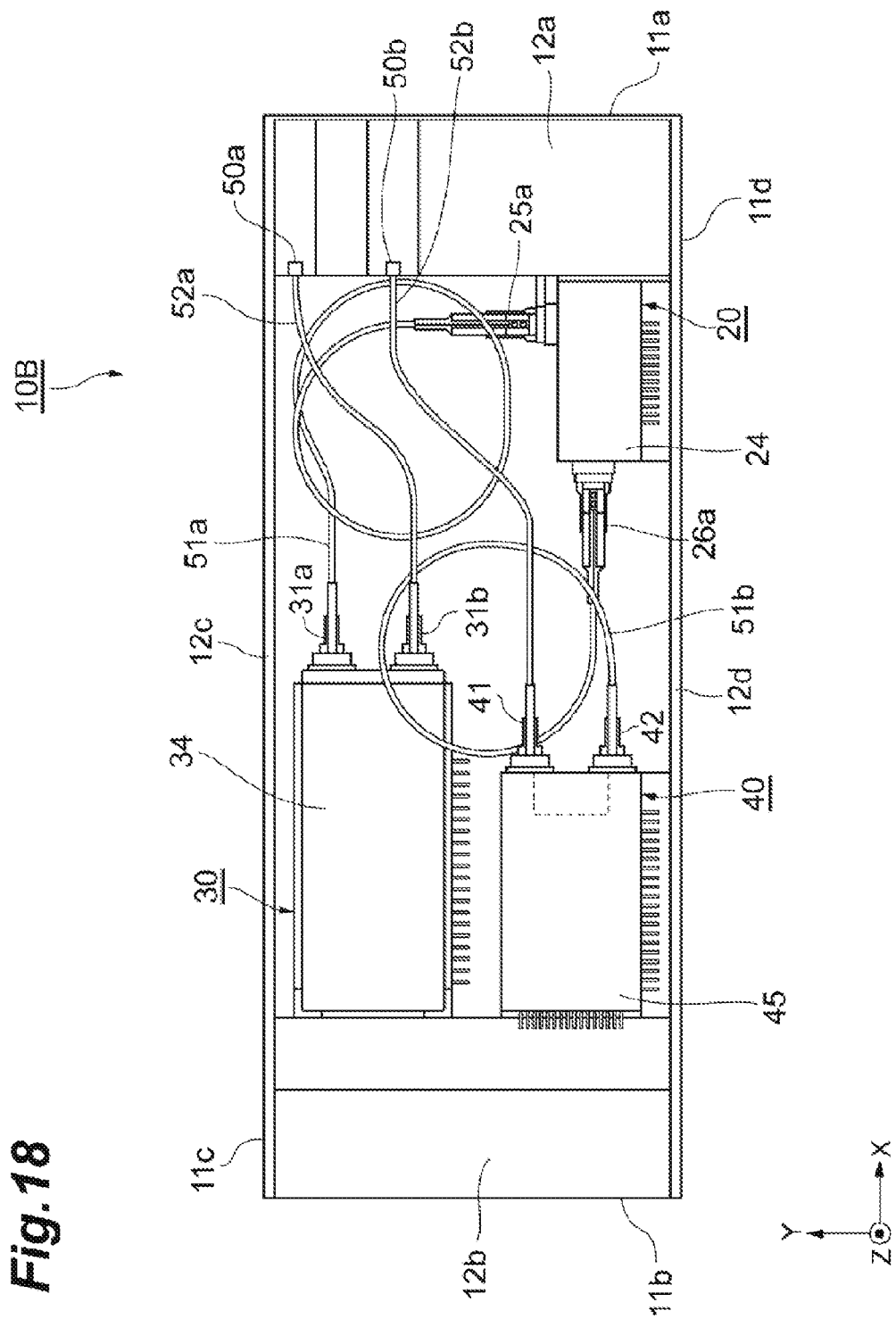
FIG. 18 is a plan view showing an inside of an optical transceiver according to the second embodiment.

FIG. 18 is a plan view showing an inside of an optical transceiver 10B of the second embodiment. The optical transceiver 10B shown in FIG. 18 has a feature distinguishable from the aforementioned optical transceiver 10 is the arrangement or the layout of the inner fibers, 51a and 51b. The inner fibers, 51a and 51b, of the present embodiment also have one loop but radii thereof are smaller than that of the aforementioned embodiment.

Specifically, the inner fiber 51b, pulled out from the output port 26a of the laser housing 24, reaches the input port 42 of the receiver module 40 by looping between the receiver module 40 and the laser module 20 without extending in the rear portion of the housing. Similarly, the other inner fiber 51a, pulled out from the output port 25a of the laser housing 24, forms a loop by turning almost 5/4-turns in a space surrounding by the laser module, the transmitter module 30, and the receiver module 40. The radii of the inner fibers, 51a and 51b, of the present embodiment are about 10 mm.

Thus, the loop for the inner fibers, 51a and 51b, in particular, the radius thereof is optional depending on the type of the optical fiber and the performance to maintain the polarization thereof. An optical fiber having a function to reduce the bending loss may be arranged with smaller loops. Adjusting excess lengths of the inner fibers as reducing the bent-stress to maintain the polarization of light propagating therein, the optical transceiver may be formed in compact.

Third Embodiment

FIG. 19 is a plan view showing an inside of a laser module 20B according to the third embodiment of the present invention. The laser module 20B shown in FIG. 19 has a feature distinguishable from the aforementioned laser module is that the local light for the receiver module and the source light for the transmitter module are extracted only from the front facet 21B of the tunable LD 21. The light output from the rear facet 21A is used only for tuning the wavelength of the laser light.

As shown in FIG. 19, the laser module 20B installs the tunable LD 21 whose arrangements are same as those of the first embodiment. The laser module 20B provides the wavelength locker 22b optical coupled with the face 21A of the tunable LD 21, and the branching system 23b. The wavelength locker 22b includes a BS 221b, an etalon filter 222b, and two PDs, 223b and 225b. The light L40 emitted from the rear facet 21A of the tunable LD 21 is first collimated by the lens 210, and split by the BS 221b into the laser beams, L41 and L42. One of the laser beam L42, reflected by the BS 221b, passes the etalon filter 222b and reaches the PD 223b. The other laser beam L41 reaches the other PD 225b. Evaluating the ratio of respective photocurrents, I1a and I2a, namely, I1a/I2a, the wavelength of the light L40 output from the tunable LD 21 may be estimated. Adjusting the temperature of the tunable LD 21 by the TEC 28, and/or varying the current injected into the tunable LD 21 based on thus estimated wavelength, the tunable LD 21 may oscillate at the target wavelength.

The branching system 23*b* includes two BSs, 231*b* and 232*b*, and a PD 233*b*. The laser beam L6 output from the front facet 21B of the tunable LD 21 is first collimated by the lens 211, and then split by the BS 231*b*. One of the split beams L46 reflected by the BS 231*b* enters the inner fiber 51*a* passing through the output port 25*a*. The other of the split beam L45 passing the BS 231*b* is split again by the BS 232*b* into two beams, L47 and L48. The laser beam L47 passing the BS 232*b* enters the inner fiber 51*b* passing the output port 26*a*. The other beam L48 reflected by the BS 232*b* reaches the PD 233*b*. The output of the PD 233*b* corresponds to the magnitude of the laser beam L6.

In the present embodiment, the laser beam L46 is provided to the transmitter module 30 substituted for the laser beam L3 of the first embodiment. That is, two modules, 30 and 40, are provided with the laser beams, L46 and L47, output from the front facet 21B of the tunable LD 21. Because the laser beam L40 output from the rear facet 21A is provided only for the wavelength locker 22*b*, the split ratio of the BS 221*b* may be about 1:1, which may secure the accuracy in the calculation of the output ratio I1*a*/I2*a*.

In the foregoing detailed description, the apparatus of the present invention have been described with reference to specific exemplary embodiments thereof. It will, however, be evident that various modifications and changes may be made thereto without departing from the broader spirit and scope of the present invention. For instance, the tunable LD 21 may provide not only an area close to one facet but areas each close to respective facets. Also, the tunable LD 21 may provide AR coating in the face thereof. Accordingly, the present specification and figures are to be regarded as illustrative rather than restrictive.

What is claimed is:

1. An optical transceiver with a function of a full-duplex optical communication for a pair of optical fibers, comprising:
    a laser module having a laser housing that encloses a wavelength tunable laser diode (LD) including a pair of facets;
    a transmitter module having a transmitter housing that encloses an optical transmitter, the optical transmitter transmitting an outgoing optical signal to the one of the optical fibers by modulating a phase of a laser beam output from one of the facets of the wavelength tunable LD, and
    a receiver module having a receiver housing that encloses an optical receiver, the optical receiver receiving an incoming optical signal from another of the optical fibers, the incoming optical signal being modulated in a phase thereof, the optical receiver extracting data contained in the incoming optical signal by multiplexing the incoming optical signal with another laser beam output from another of the facets of the wavelength tunable LD;
    a first inner fiber and a second inner fiber, the first fiber coupling the laser module with the transmitter module, the second inner fiber coupling the laser module with the receiver module,
    wherein the first inner fiber and the second inner fiber each have at least one loop between the laser module and the transmitter module, and between the laser module and the receiver module, respectively,
    wherein the laser housing, the transmitter housing, and the receiver housing are separated from each other, and
    wherein the first and second inner fibers are polarization maintaining fibers.

2. The optical transceiver of claim 1,
    wherein the first inner fiber extends from the laser module along a first direction, and the second inner fiber extends from the laser module along a second direction perpendicular to the first direction.

3. The optical transceiver of claim 2,
    further comprising a housing with a rectangular shape that installs the laser module, the transmitter module, the receiver module, and the first and second inner fibers therein,
    wherein one of the first direction and the second direction is in parallel to a longitudinal direction of the housing, and another of the first direction and the second direction is in perpendicular to the longitudinal direction of the housing.

4. An optical transceiver with a function of a full-duplex optical communication for a pair of optical fibers, comprising:
    a laser module having a laser housing that encloses a wavelength tunable laser diode (LD) including a pair of facets;
    a transmitter module having a transmitter housing that encloses an optical transmitter, the optical transmitter transmitting an outgoing optical signal to the one of the optical fibers by modulating a phase of a laser beam output from one of the facets of the wavelength tunable LD; and
    a receiver module having a receiver housing that encloses an optical receiver, the optical receiver receiving an incoming optical signal from another of the optical fibers, the incoming optical signal being modulated in a phase thereof, the optical receiver extracting data contained in the incoming optical signal by multiplexing the incoming optical signal with another laser beam output from another of the facets of the wavelength tunable LD;
    wherein the laser housing, the transmitter housing, and the receiver housing are separated from each other,
    wherein the transmitter housing has a rectangular shape with a side providing an input port and an output port, the input port receiving the laser beam provided from the laser module, the output port transmitting the outgoing optical signal to one of the optical fibers, and
    wherein the transmitter housing further includes another side and rest sides, the another side being opposite to the side that provides the input port and the output port, the another side including terminals for transmitting high frequency signals, the rest sides connecting the side providing the input port and the output port to the another side, the rest sides including terminals for transmitting DC and low frequency signals.

5. The optical transceiver of claim 4,
    further comprising a transmitter optical receptacle coupled with the one of the optical fibers,
    wherein the output port of the transmitter housing is connected with the transmitter optical receptacle with an inner fiber without forming any loop.

6. The optical transceiver of claim 5,
    wherein the inner fiber connecting the transmitter optical receptacle with the output port of the transmitter housing is a single mode fiber.

7. The optical transceiver of claim 4,
    further comprising a circuit board and a relay board providing electrical plug,
    wherein the terminals in the another side for transmitting the high frequency signals are connected to the relay board without passing the circuit board and the terminals in the rest sides for transmitting the DC and low frequency signals are connected to the relay board through the circuit board.

8. An optical transceiver with a function of a full-duplex optical communication for a pair of optical fibers, comprising:
- a laser module having a laser housing that encloses a wavelength tunable laser diode (LD) including a pair of facets;
- a transmitter module having a transmitter housing that encloses an optical transmitter, the optical transmitter transmitting an outgoing optical signal to the one of the optical fibers by modulating a phase of a laser beam output from one of the facets of the wavelength tunable LD; and
- a receiver module having a receiver housing that encloses an optical receiver, the optical receiver receiving an incoming optical signal from another of the optical fibers, the incoming optical signal being modulated in a phase thereof, the optical receiver extracting data contained in the incoming optical signal by multiplexing the incoming optical signal with another laser beam output from another of the facets of the wavelength tunable LD;
- wherein the laser housing, the transmitter housing, and the receiver housing are separated from each other,
- wherein the receiver housing has a rectangular shape with a side providing an input port and another input port, the input port receiving the another laser beam provided from the laser module, the another input port receiving the incoming optical signal from the another of the optical fiber, and
- wherein the receiver housing further includes another side and rest sides, the another side being opposite to the side providing the input port and the another input port, the another side including terminals for transmitting high frequency signals, the rest sides connecting the side providing the input port and the another input port to the another side, the rest sides including terminals for transmitting DC and low frequency signals.

9. The optical receiver of claim 8,
further comprising a receiver optical receptacle coupled with the another of the optical fiber,
wherein the input port of the receiver housing is connected with the receiver optical receptacle with an inner fiber without forming any loops.

10. The optical receiver of claim 9,
wherein the inner fiber connecting the receiver optical receptacle with the input port of the receiver housing is a single mode fiber.

11. The optical transceiver of claim 8,
further comprising a circuit board and a relay board providing electrical plug,
wherein the terminals in the another side for transmitting the high frequency signals are connected to the relay board without passing the circuit board and the terminals in the rest sides for transmitting the DC and low frequency signals are connected to the relay board through the circuit board.

\* \* \* \* \*